United States Patent
Huang et al.

(10) Patent No.: US 6,571,245 B2
(45) Date of Patent: *May 27, 2003

(54) VIRTUAL DESKTOP IN A COMPUTER NETWORK

(75) Inventors: Erwin S. Huang, San Francisco, CA (US); Chan S. Kwan, Hong Kong SAR (CN); Tse P. Hung, Hong Kong SAR (CN); Lau C. Kwok, Hong Kong SAR (CN); Wong K. Fung, Hong Kong SAR (CN); Tsoi Ng, Hong Kong SAR (CN); Chow W. Kin, Hong Kong SAR (CN); Chan F. Chun, Hong Kong SAR (CN)

(73) Assignee: Magically, Inc., Woodside, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,412

(22) Filed: Jan. 28, 1999

(65) Prior Publication Data

US 2002/0091697 A1 Jul. 11, 2002

Related U.S. Application Data

(60) Provisional application No. 60/111,341, filed on Dec. 7, 1998.

(51) Int. Cl.[7] .......................... G06F 17/30; G06F 15/16

(52) U.S. Cl. ........................ 707/10; 707/201; 709/218; 709/248

(58) Field of Search ........................... 707/10, 501, 513, 707/201; 709/203, 217–219, 248

(56) References Cited

U.S. PATENT DOCUMENTS

| | | | | |
|---|---|---|---|---|
| 5,832,506 A | * | 11/1998 | Kuzma | 707/200 |
| 6,961,590 A | * | 10/1999 | Mendez et al. | 709/206 |
| 5,987,245 A | * | 11/1999 | Gish | 709/310 |
| 6,014,676 A | * | 1/2000 | McClain | 707/204 |
| 6,023,708 A | | 2/2000 | Mendez et al. | 707/203 |
| 6,075,528 A | * | 6/2000 | Curtis | 345/333 |
| 6,115,040 A | * | 9/2000 | Bladow et al. | 345/335 |
| 6,147,687 A | * | 11/2000 | Wanderski | 345/356 |

OTHER PUBLICATIONS

"Virtual Network Computing," Richardson et al., IEEE Internet Computing, Jan., 1998, vo. 2, No. 1, pp. 33–38.*
"Remote Laboratory Experiments," Mohamed Shaheen et al., Proceedings of the American Control Conference, Philadephia, PA, Jun., 1998, pp. 1326–1329.*

* cited by examiner

Primary Examiner—Hosain T. Alam
(74) Attorney, Agent, or Firm—Dinh & Associates

(57) ABSTRACT

A network of servers coupled to the Internet provides a virtual desktop in a virtual computing environment. A user is able to access the virtual desktop from a variety of systems through various communications links. A site server initially receives a URL access from the user at a local system. After a successful login, a personal web page of the user is retrieved from a file server and returned to the local system. Through the personal web page, the user is able to send commands that are received and processed by one or more backend servers. The web page represents the virtual desktop of the user and includes links for applications available to the user, files and folders accessible by the user, and other personal information of the user. The network provides facilities to manipulate and manage files, and facilities to access and process data from web sites on the Internet.

17 Claims, 16 Drawing Sheets

VIRTUAL DESKTOP IN A COMPUTER NETWORK

This application claims the benefit of U.S. provisional Application Serial No. 60/111,341, also entitled "VIRTUAL DESKTOP IN A COMPUTER NETWORK," filed Dec. 7, 1998 expired, which is incorporated herein by reference.

BACKGROUND OF THE INVENTION

The present invention relates generally to computer systems, and more particularly to techniques for providing a virtual desktop in a computer network.

Many individuals extensively or periodically interface with a computer system for work or leisure. These individuals maintain desktop or portable computer systems and are typically able to customize the systems according the their specific needs and preferences. The customization can range from the set of application software installed on the system, the arrangement of the desktop icons, the organization of the file management system, the settings of the CRT display and mouse control, and so on.

For those who regularly interface with computers, many have access to multiple computer systems. For example, a user may be assigned a desktop computer system at work and may also maintain a personal computer system at home. The user may also have access to additional computer systems, such as a portable computer system assigned for business trips or other miscellaneous systems when on travel. These numerous systems are usually not maintained to be replicas of each other and have different customizations. As such, they are typically installed with different applications, contained different files that are organized in different arrangements, and have different desktop "feels."

In most situations, it is highly desirable and efficient to provide a "virtual" computing environment such that the user sees the same desktop with which the user is accustomed, has access to the same applications and files, and enjoys the same amenities regardless of the computer system on which the user gains access. The virtual computing environment is particularly advantageous for individuals who travel often, for telecommuters who alternate between working at home or remote sites and the office, for individuals who perform portions of their office work at home, for individuals who gain access to other computer systems outside their normal computing environment, and many others.

One way to achieve a virtual computing environment is for the user to maintain identical computer systems. However, this technique is impractical in most instances because of the enormous amount of time and effort necessary to keep track of changes and update all systems. As a compromise, the user typically maintains the various systems to be as nearly identical as practical. However, the applications and files on these systems are usually not maintained current. Often times, one system has a copy of the most current work file and the remaining systems contain old versions, if at all, of the same file. Consequently, the differences that exist between the various systems undermine the advantages to be gained by maintaining nearly identical computer systems.

Another way to achieve a virtual computing environment is to maintain a network of identical computer systems. In this technique, each computer on the network is set up with identical desktop, applications, and file management system such that the user sees the same interface and has access to the same resources from any one of the computer systems connected to the network. The work files can be stored in a central location that is accessible from the computer systems on the network. However, this rigid desktop requirement prevents the user from customizing the desktop to the user's particular needs and preferences. Additionally, the benefits are only realized from having access to the particular systems connected to the network. Often times, the home and portable computer systems are not connected to the network. Thus, the advantages provided by this technique are limited.

As can be seen from the above, a virtual computing environment that provides the user with a "virtual" desktop accessible from a wide range of computer systems is highly desirable.

SUMMARY OF THE INVENTION

The invention provides a virtual desktop in a virtual computing environment. In an embodiment, the virtual computing environment is supported by a network of servers coupled to the Internet. The user is able to access the servers from a variety of systems through various communications links available to connect to the Internet.

A specific embodiment of the invention provides a computer-implemented method for providing a virtual desktop. A site server initially receives a URL access from a user at a local system. After a successful login, a personal web page of the user is retrieved from a file server and returned to the local system. Through the personal web page, the user is able to send commands that are received and processed by one or more backend servers. The web page represents the virtual desktop of the user and includes links for applications available to the user and files accessible by the user. The web page can also include links to personal information of the user.

Various aspects of the invention support the many features of the virtual desktop. For file manipulation, the virtual desktop includes applications that facilitate file creation, editing, conversion, e-mail, and so on. For file management, the virtual desktop includes a synchronization folder that contains files and folders to be maintained current with similar items on a synchronization folder on the local system. At designated times, the items in these synchronization folders are compared and updated, if necessary. The virtual desktop also includes facilities that allow for convenient access to news, information, and services on the Internet, and easy manipulation of retrieved information.

Another specific embodiment of the invention provides a computer-implemented method for storing information representative of a virtual desktop for a user. A file server receives information indicative of: (a) a layout of the virtual desktop, (b) a list of applications available to the user, and (c) files and folders associated with the user. Personal information can also be provided to the file server. The user information is maintained in a data record that is stored in the file server. For efficient implementation, the record can be partitioned and portions of the record can be stored in different databases on multiple file servers.

Yet another specific embodiment of the invention provides a computer network configured to provide a virtual computing environment. The network includes one or more servers. At least one of the servers includes a processor, an electronic storage medium (e.g., disk, tape, CD, and other storage media), and a memory. The servers are configured to receive a URL access from a user at a local system, retrieve a personal web page of the user from a file server, and transmit the personal web page to the local system. The servers are also configured to receive and process user commands that have been entered through the personal web. The web page represents the virtual desktop of the user and includes icons for applications available to the user and files accessible by the user.

The foregoing, together with other aspects of this invention, will become more apparent when referring to the following specification, claims, and accompanying drawings.

DESCRIPTION OF THE SPECIFIC EMBODIMENTS

System Description

Figure 1:
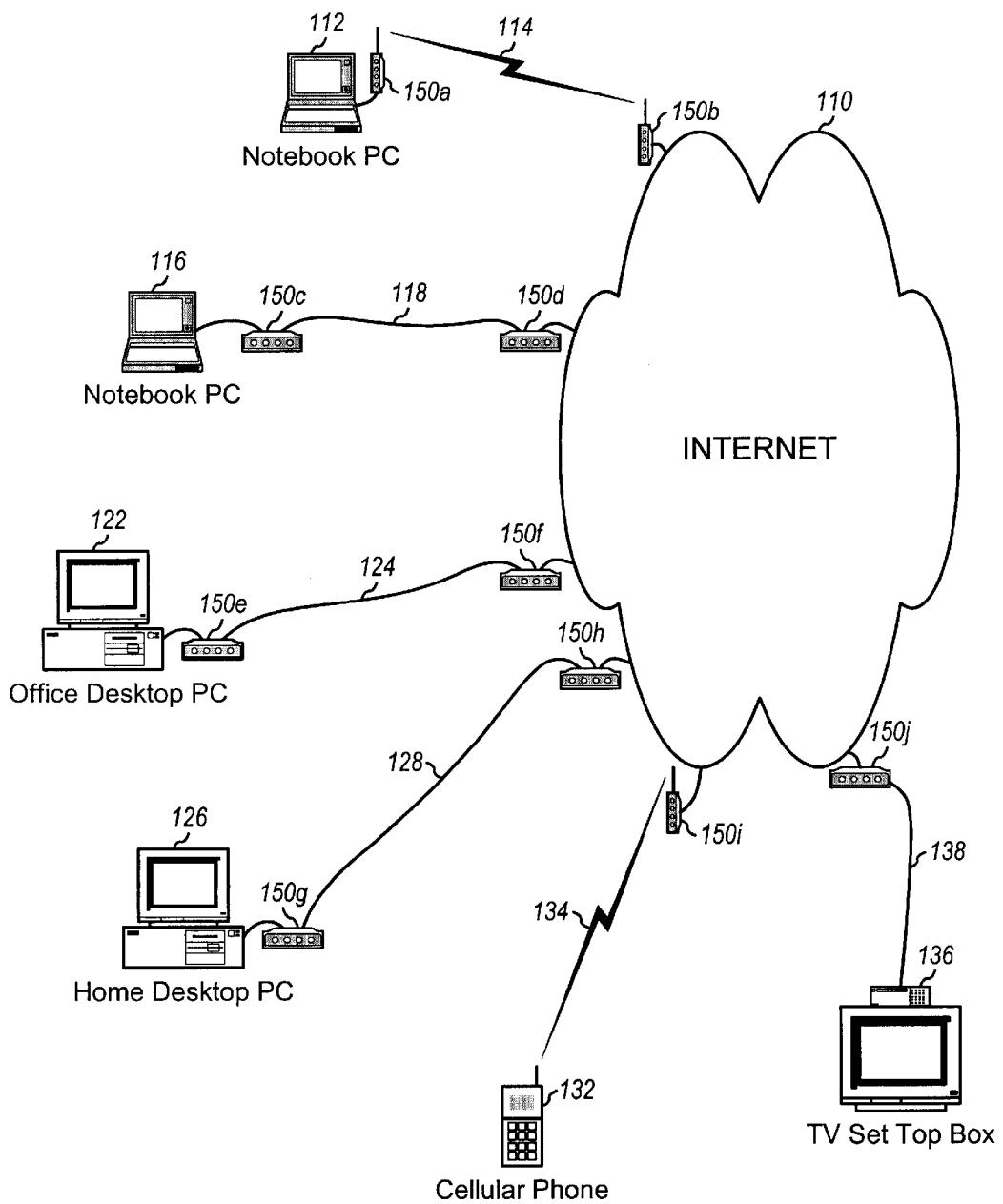
FIG. 1 is a diagram that illustrates the enormous interconnectivity provided by an Internet-based computer network of the invention.

FIG. 1 is a diagram that illustrates the enormous interconnectivity provided by an Internet-based computer network of the invention. As shown in FIG. 1, numerous systems can gain access to the Internet 110 through a wide range of communications channels. For example, access to the Internet 110 can be gained by a portable notebook personal computer (PC) 112 though a wireless link 114, a notebook PC 116 through a wireline link 118, an office desktop PC 122 through a high speed modem link 124 (e.g., T1, ISDN, or others), a home desktop PC 126 through a telephone link 128, a mobile cellular phone 132 through a cellular link 134, and a television set top box 136 through a cable link 138. In FIG. 1, modems 150 facilitate communications between the respective systems and the Internet. Although all modems are similarly designated in FIG. 1, in actuality, they are specifically designed to support the particular link to which they are coupled. The connections are typically TCP/IP (Transmission Control Protocol/Internet Protocol) connections, but other connections and protocols are possible. For example, the connection may be a SLIP/PPP (Serial Link IP/Point-to-Point Protocol) connection.

Other communications links that may be used to connect to the Internet include, for example, a terrestrial link, a microwave link, a satellite link, and others. The communications link can be symmetric (i.e., having the same data bandwidth in both directions). Alternatively, the communications link can be unsymmetrical such that, for example, the downstream bandwidth from the Internet to the system is greater than the upstream bandwidth from the system to the Internet.

Figure 2:
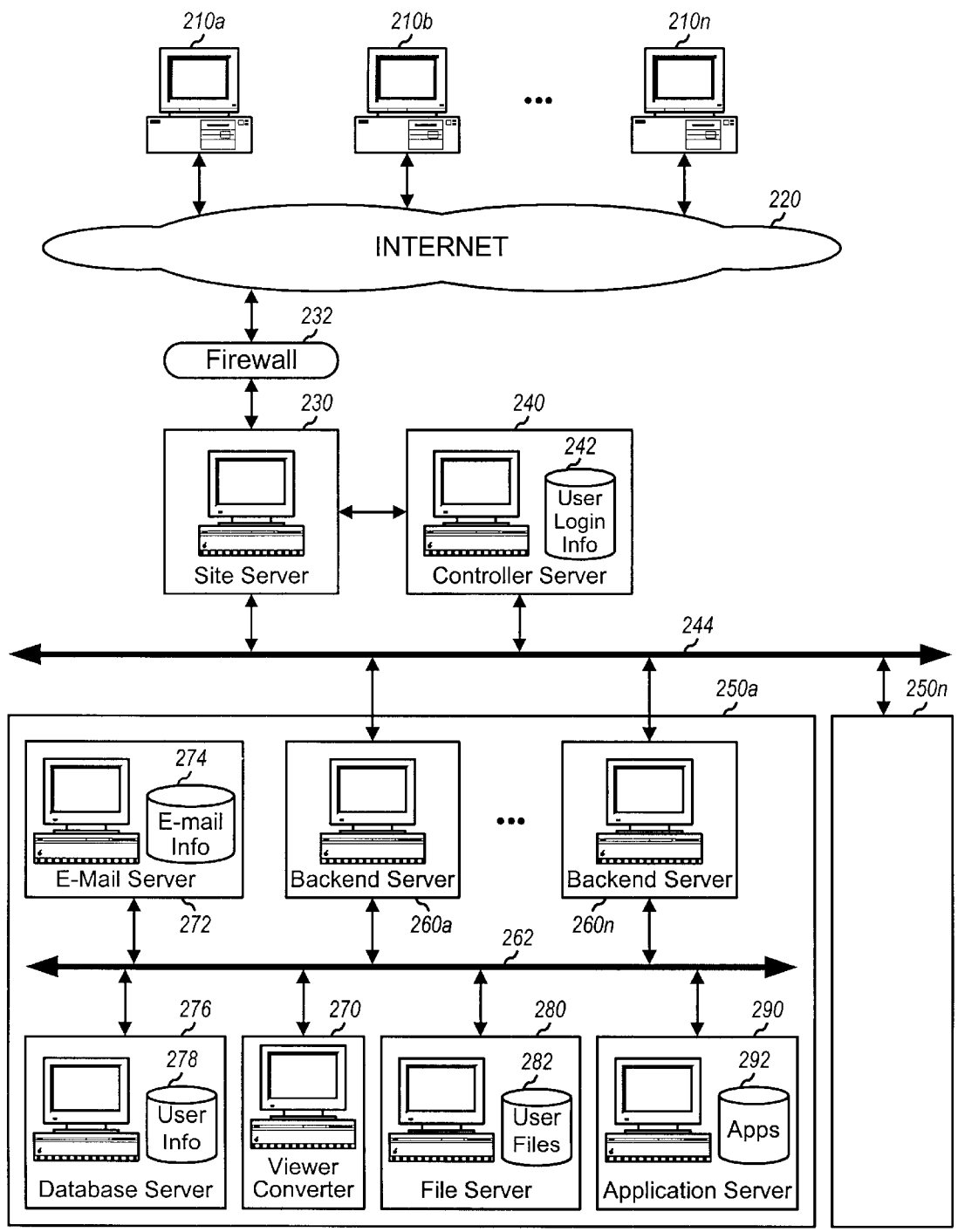
FIG. 2 shows a diagram of an embodiment of a computer network 200 that implements a virtual computing environment and supports the virtual desktop of the invention.

FIG. 2 shows a diagram of an embodiment of a computer network 200 that implements a virtual computing environment and supports the virtual desktop of the invention. Within network 200, a number of computer systems 210 couples to the Internet 220 through various communications links described above. Computer systems 210 can represent the various systems depicted in FIG. 1. The Internet 220 is a collection of networks that allows files and resources on computers interconnected to the networks to be shared. A site server 230 also couples to the Internet 220 through a firewall 232. Firewall 232 provides a security wall between site server 230 and the Internet 220 and is discussed in further detail below.

Site server 230 is a Uniform Resource Locator (URL) site (e.g., MAGICALLY.COM) to which computer systems 210 connect. Site server 230 processes a user's login, which typically includes receiving the user's identification and password. Site server 230 couples to, and provides the login information to, a controller server 240. Controller server 240 checks the login information against a database 242 of login information to determine whether the user is authorized for access to the network. If the user is authorized, controller server 240 determines the appropriate Hypertext Transport Protocol (HTTP) server to which the user should be directed. In a large network that includes more than one backend server, controller server 240 directs the user computer system to the appropriate (i.e., the least congested) backend server. In an embodiment, site server 230 and controller server 240 are integrated into one server.

Site server 230 further couples to a bus 244 that interconnects one or more regional networks 250. Each regional network 250 supports a particular geographic area. For example, regional network 250a can cover a geographic area such as the United States and regional network 250n can cover another geographic area such as Asia. Within each regional network 250, a number of backend servers 260 services the assigned geographic area. Tasks can be received and forwarded for processing by any one of backend servers 260 then available. Backend servers 260 farther couple to a bus 262 that also interconnects a viewer converter 270, an e-mail server 272, a database server 276, a file server 280, and an application server 290. E-mail server 272 couples to an e-mail database 274, database server 276 couples to a user information database 278, file server 280 couples to a user file database 282, and application server 290 couples to an application database 292. Data in databases 274, 278, 282, and 292 may be stored using, for example, an SQL format that is well known in the art. Also, in an embodiment, converter 270 and servers 272, 276, 280, and 290 can be directly coupled to bus 244.

In an embodiment, e-mail server 272 is implemented with a combination of a POP3 server and a SMTP server. The POP3 server processes the received e-mail messages, and the SMTP server processes the outgoing e-mail messages.

The functions performed by converter 270 and servers 272, 276, 280, and 290 are described in detail below. Further, the functions of backend server 260, viewer converter 270, e-mail server 272, database server 276, file server 280, and application server 290, or a combination of these servers, can be integrated and provided by one or more servers.

The configuration of network 200 in FIG. 2 provides many advantages, including interconnectivity (i.e., global Internet access) and scalability. For example, additional regional networks 250 can be added to bus 244 as appropriate. Also, the regional networks can be reconfigured to cover a smaller geographic area due, for example, to increased demands for the servers within regional networks. Also, additional backend servers 260 can be added to a particular regional network 250 as necessitated by traffic demands. Regional network 250 is also scalable by adding additional converters, file servers, and application servers as necessary.

Virtual Desktop

The invention provides a virtual desktop in a virtual computing environment such that a user sees the same desktop and has access to the same applications, files, and amenities independent of the particular computer system on which the access is gained. The user is also provided with tools that allow the user to customize the desktop to whatever configuration the user finds preferable. The virtual desktop is provided through a web browser, or similar applications, that interfaces the user with a backend server on a network such as the Internet.

Numerous advantages can be realized through a virtual computing environment wherein the network provides many of the functions and features of the computer. First, the user enjoys a 'virtual' desktop work environment regardless of the computer through which access is gained to the Internet. Familiarity with a particular desktop can enhance efficiency and improves productivity. Second, because of the ubiquitous nature of the Internet, the user is able to gain access to a familiar computing environment through numerous means and from almost anywhere. This effectively provides the user with global access from the home, office, while on travel, and so on. Third, the virtual work environment allows the user to have access to the same files and resources from anywhere. This allows the user to work on a particular document using a particular application from virtually any location with Internet access. Additional features are also provided by the invention by virtue of the integration of the resources. For example, the invention can provide an automatic file backup system, file synchronization, and so on, which are discussed below.

In illustrating the invention with respect to its implementation in conjunction with a web browser application (or browser), a few terms will now be defined. A Universal Resource Locator (URL) is a well-known element widely used in communications systems that make up the World Wide Web (or web). URL is used as an identifier to point to a specific site or location of a computer and its contents on the web. A given URL typically points to a Hyper Text Markup Language (HTML) encoded page of data, but it may also point to a text file, an image, or even a moving image stream. The URLs are specified by the user (i.e., through a user interface). The browser is an application program that requests, receives, processes, and presents data pointed to by the URLs. The browser normally selects the appropriate method to process each type of data that is received and then displays an HTML page of the data. The browser has the ability to move in response to the user's direction from one specified URL content to another. For example, if the user selects a link in an HTML page, the browser will access the new URL location pointed to by the link.

In the invention, the user initially activates a browser application program installed on computer system 210 in FIG. 2. Typical browser application programs such as Navigator™ from Netscape Corporation and Internet Explorer™ from Microsoft Corporation are well known and readily available. The browser is executed by (double) clicking on the browser icon or through other means (i.e., executing the browser from the desktop file management system).

When the browser's main screen comes up, the user enters into a user interface field the URL of the site server that supports the virtual desktop. For example, the user can enter the web site "HTTP//MAGICALLY.COM" and hit the carriage return <CR> key. The user can also activate the URL search by selecting a bookmark under the browser's pull down main menu (i.e., "BOOKMARKS" in the Navigator™ browser). The browser then searches for the web site and retrieves from the appropriate site server a web page corresponding to the entered URL.

The URL site server provides data contents, called a web page, that are processed by the browser and presented for display on the CRT of the user's computer system. The processing can be performed by either the browser's own facilities, facilities provided by the operating system under which the browser executes, other facilities provided by the applications concurrently executing along with the browser, or a combination of the above. The web page can contain any mixture of text, graphic imagery, pictures, sounds, and even motion picture information. The web page also includes a login window. Upon a successful login, the user's personal web page that displays the virtual desktop is provided to the user's computer system. The login process is described in further detail below.

Figure 3:
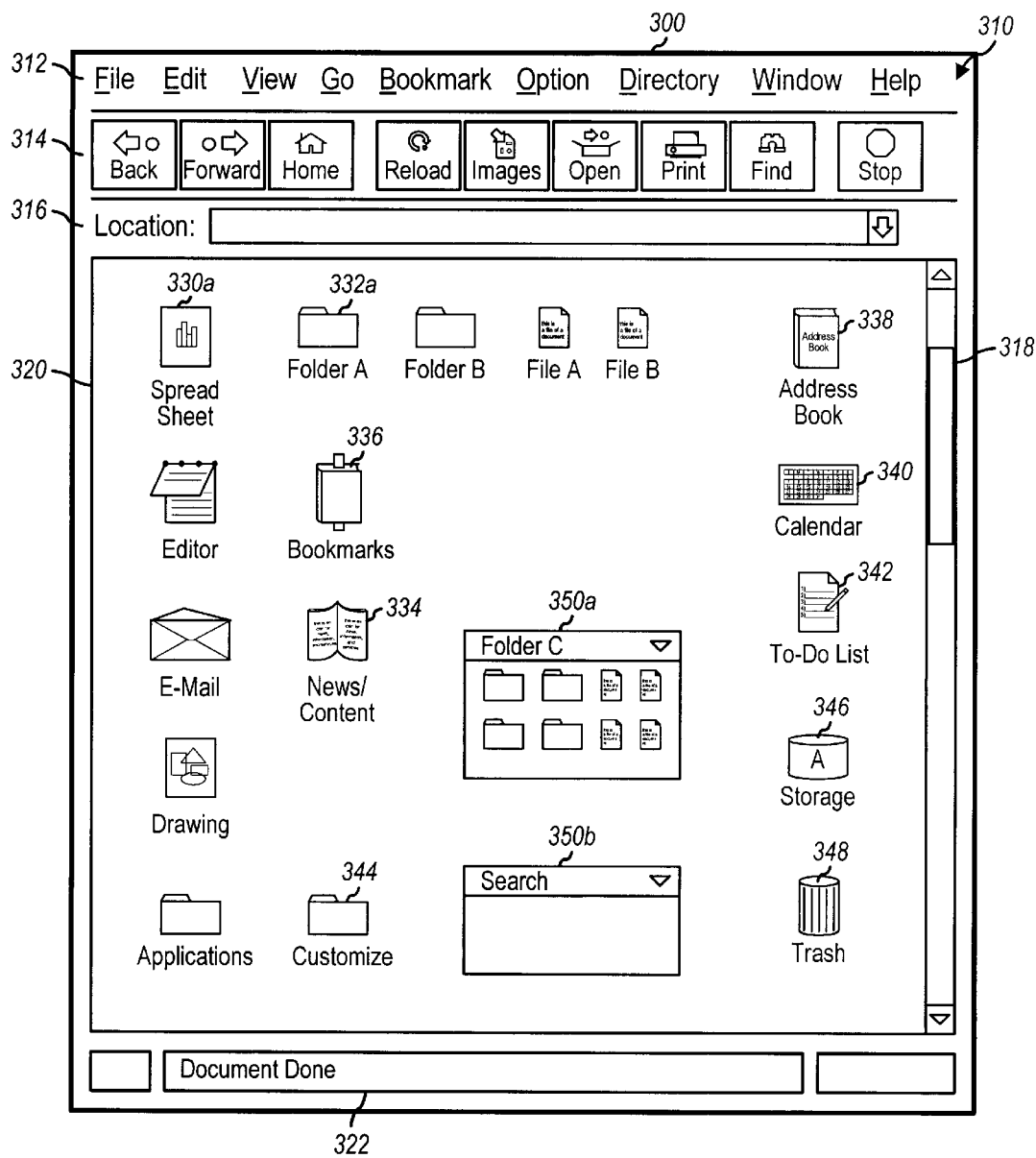
FIG. 3 shows a diagram of a browser display of a representative virtual desktop for a particular user that has been retrieved from the URL web site.

FIG. 3 shows a diagram of a browser display of a representative virtual desktop for a particular user that has been retrieved from the URL web site. A browser display 300 includes a user interface control area 310 and a display area 320. Control area 310 can include pull down menus 312, an array of functionally selectable buttons 314, a typing field 316, and a scroll bar 318 that enables the user to scroll through the page(s) in display area 320. Additional information, icons, control functions, and the like can also be displayed in control area 310. For example, a URL field 322 can be provided at the bottom of display 300 to indicate the URL associated with a link in display area 320 whenever the user passes the mouse pointer over the link. Control area 310 can be rearranged or reconfigured, to an extent as allowed by the particular browser application, based on the user's preference. However, changes made to control area 310 are generally localized to the particular computer system on which the browser is installed.

Display area 320 represents the virtual desktop of the user and can be customized according to the user's needs and preferences. As shown in FIG. 3, display area 320 includes icons 330 for applications available to the user, icons 332 for folders and files, an icon 334 for sources of news and information, an icon 336 for browser bookmarks, an icon 338 for an address book, an icon 340 for a calendar, an icon 342 for a to-do list, an icon 344 for customization tools, an icon 346 for storage, an icon 348 for trash, and windows 350 that pop up on display area 320 based on selections by the user. The various icons enumerated above can be replaced or supplemented with toolbars, lists, objects, or other indicators that identify the underlying items for which they represent. Application icons 330 can be provided for applications such as word processing (e.g., Word™ and WordPerfect™), spread sheet (e.g., Excel™ and Lotus123™), presentation (e.g., PowerPoint™), e-mail, and others. The various trademarked products are from Microsoft Corporation and Lotus Corporation. Display area 320 can also have a wallpaper background selected by the user based on personal preference.

Figure 4:
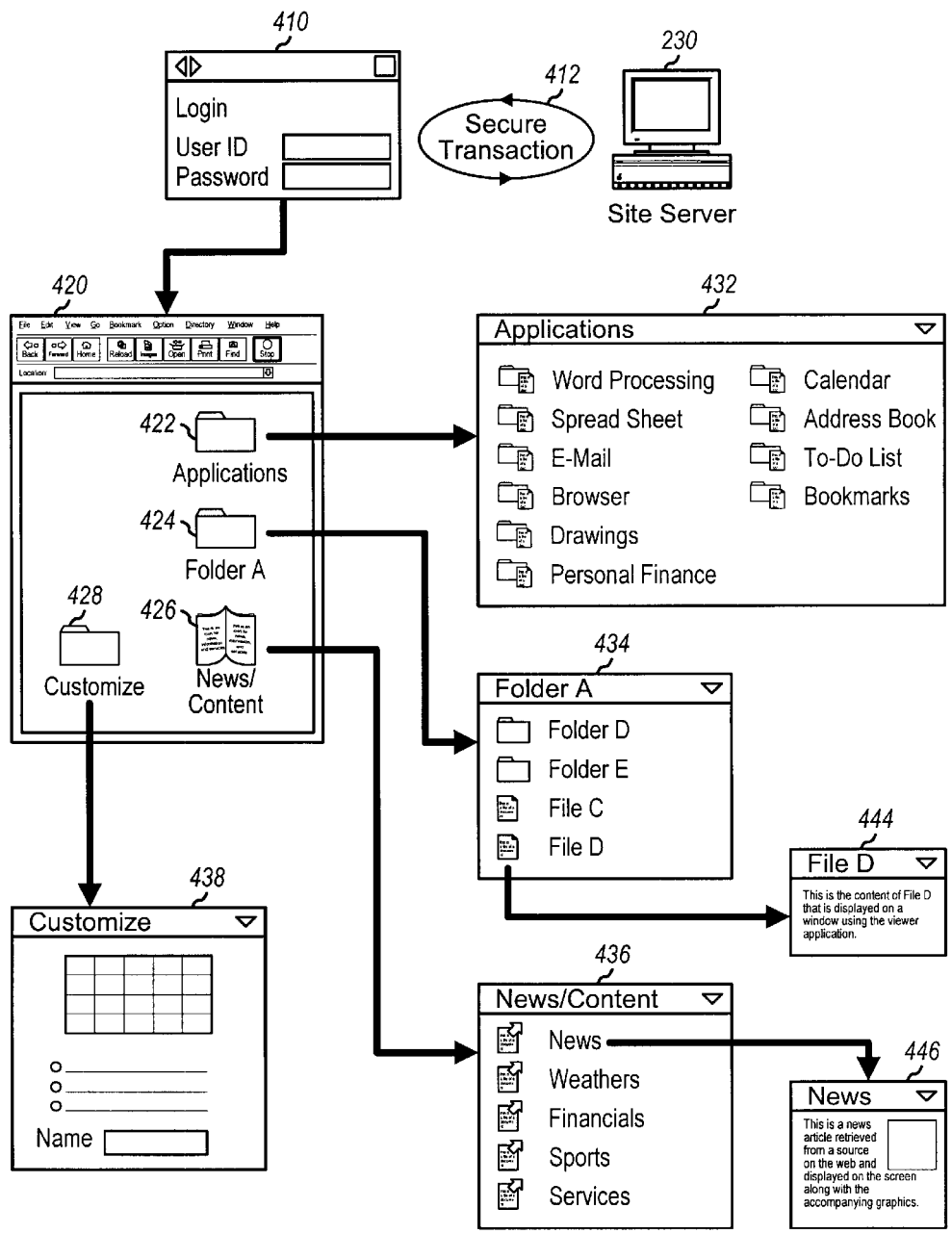
FIG. 4 shows, in summary form, some of the processes and features provided by the virtual desktop of the invention.

FIG. 4 shows, in summary form, some of the processes and features provided by the virtual desktop of the invention. As shown in FIG. 4, the web page from the site server initially includes a login window 410 that prompts the user for an identification and a password. The user then enters the requested information in the appropriate fields. Upon indicating that the information has been entered (i.e., by hitting the carriage return in the password field), a secured transaction 412 is initiated with URL site server 230. The login information is securely transmitted to site server 230 using, for example, a Secured Socket Layer (SSL) based security technique. Site server 230 determines whether the user is registered and, if yes, transmits the user's personal web page. The login process is described in further detail below.

After a successful login, the user's personalized virtual desktop 420 is transmitted, received, and displayed. Desktop 420 corresponds generally to browser display 300 in FIG. 3. The user can then activate the features of the virtual computer by activating the appropriate icon from virtual desktop 420. In general, through virtual desktop 420, the user has access to applications, files, news and information, and additional features.

To execute a particular application, the user (double) clicks on the icon representing that application and, in response, the site server cooperates with the application server to allow execution of the selected application. Depending on the particular application, the application server can transmit applets of the application which are then executed by the browser. The application server can also transmit codes for the application which are then executed on the user's computer system. The application server can also execute the application at the server site and communicates the data and correspondences with the user's computer system. The user may also be given a choice to direct execution of the application on a particular computer or server. Once the selected application is executed, the user interacts with the application in similar manner as if the application is executing on the user's computer. The user is practically unaware of the difference in the computing environment.

The applications available to the user can also provide other features and amenities. For example, by clicking on an application icon 422, a list of available applications is displayed on a window 432. This list may include, for example, icons for a calendar, e-mail, to-do list, address book, bookmarks, browsers, and so on.

The user can manage files and folders through a file management system provided by the virtual computing environment. Because of the extensive interconnectivity associated with the Internet, the file management system provides additional advantages and features not normally associated with a stand-alone computer or a local area network. For example, separate folders can be provided for the user's private files, public files, and limited access files. These file types have different attributes. These and other features of the file management system are described in farther detail below.

To activated a folder, the user simply (double) clicks on a folder icon 424. A window 434 then appears which contains the files and folders associated with the selected folder. A folder within window 434 can then be selected and, in response, an additional window appears which contains the files and folders associated with that selected folder. Alternatively, window 434 can be refreshed with the contents of the selected folder each time a folder is selected. If the user selects a file, a viewing window 444 appears which displays the data in the selected file.

An advantage provided by the Internet-based computer network is the ability to easily gather news and information from various web sites. As such, virtual desktop 420 can include icons corresponding to, or including, URL links to news and content sources. The user can access the sources by (double) clicking on a news icon 426 that then opens a window 436. Window 436 can include URL links to other web sites. Each link is associated with the URL of another web page on the web. The URL links appear to the user as text that is highlighted in some manner, such as underlining and/or colored text. The URL links can be arranged by category, in alphabetical order, or by other arrangements based on user preference. By selecting the link with the mouse or other pointing device, the user can move to a web page corresponding to the selected link which is displayed in a window 446. The operation of the news/content aspect of the invention is described in further detail below.

The virtual desktop layout and configuration can be tailored to the user's particular preference. Customization of virtual desktop 420 can be initiated by (double) clicking on a customize icon 428 that activates a customize window 438. Customize window 438 includes the tools and features that allow the user to customize the virtual desktop. The operation of the customization feature of the invention is described in further detail below.

Figure 5:
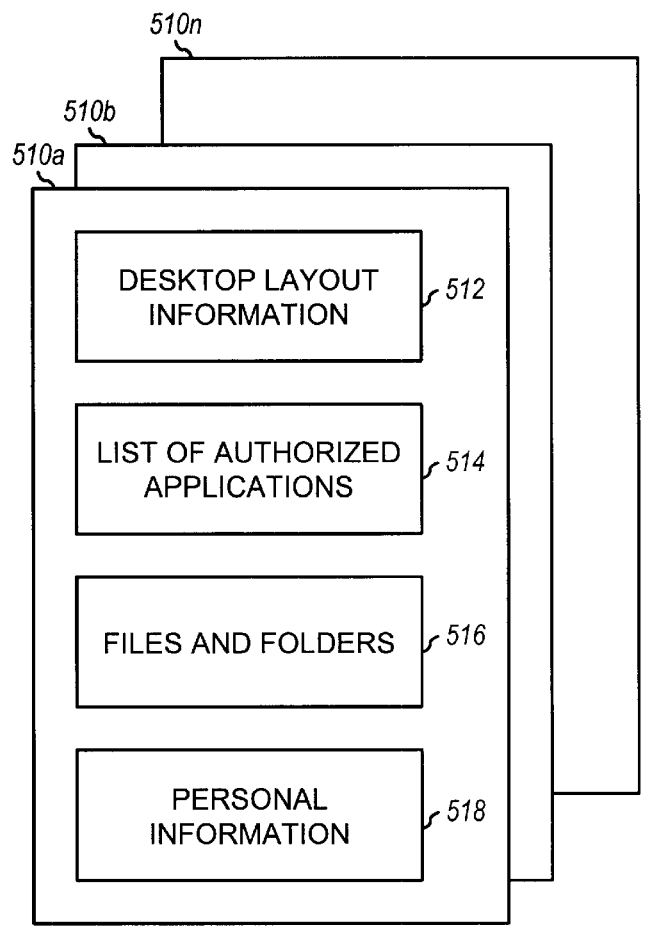
FIG. 5 shows a diagram of an embodiment of the data stored for the users in the virtual computing environment.

FIG. 5 shows a diagram of an embodiment of the data stored for the users in the virtual computing environment. Referring back to FIG. 2, data associated with the users is stored in one or more databases, including user login information database 242, e-mail database 274, user information database 278, and user file database 282. The information associated with each user can be represented by a data record 510. Data record 510 includes, for example, virtual desktop layout information 512, a list of applications 514 that the user has been authorized for access, files and folders 516, and personal information 518. Additional types of data can be stored for each user. Also, the data size for each data type can vary from user to user based on, for example, a particular user's requirements. The number of files and the total storage area typically vary among users. The number of applications authorized and the amount of available storage space may further be dependent on, for example, payment of a service fee.

Although the data for each user is shown as being integrated to a single data record, the data within the record may, in actuality, be stored in separate databases. For example, the desktop layout information, the list of authorized applications, and the personal information for all users may be stored in user information database 278, and the files and folders may be stored in user file database 282. Alternatively, the entire record may be stored on one database at a central server.

File Management

The file management system allows the user to manipulate files and folders in similar manner as for a desktop PC, including create, save, rename, delete, copy, cut, paste, find, and so on. In addition, because the files are maintained in a network environment, the invention provides other file manipulation capabilities not available on the desktop PC, including file sharing, access control, and others. The invention also provides additional features through a high level of integration between the file management system and the applications, as explained below.

Figure 6:
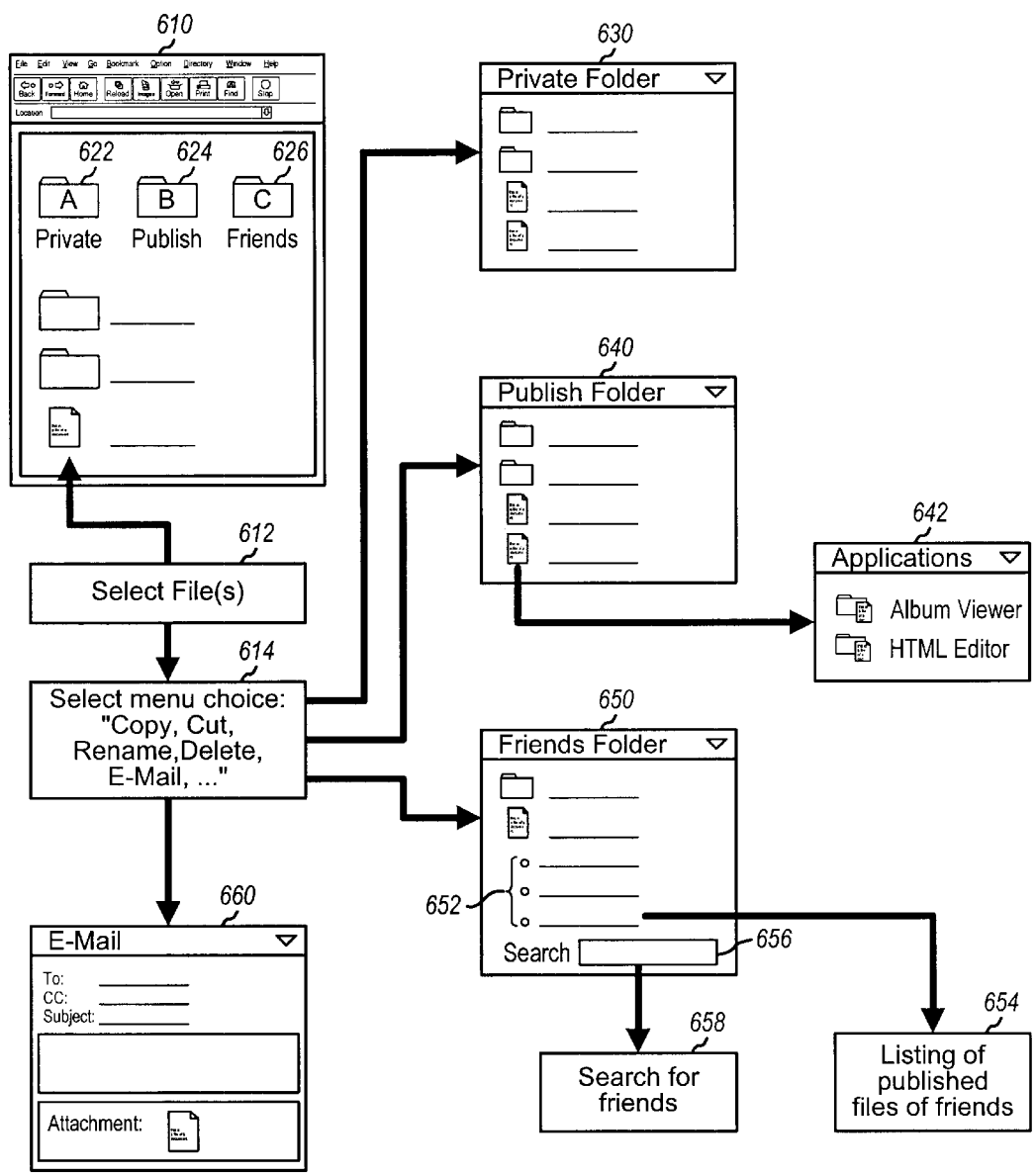
FIG. 6 shows a diagram of some of the processes of the file management system of the invention.

FIG. 6 shows a diagram of some of the processes of the file management system of the invention. A virtual desktop 610 includes a number of files and folders created by the user and the system. Desktop 610 generally corresponds to window 300 in FIG. 3 with the other icons not shown for clarity. The files and folders can be displayed using various formats including large icons, small icons, listings, or a combination of the above.

The user selects a particular file or folder in file window 610 by (double) clicking on the particular item (as indicated at 612). Upon making the item selection, a window appears which enumerates the available menu choices for the selected item (as indicated at 614). For example, the user can create a duplicate of the selected item, make a copy of the selected item into another folder, and so on.

Because of the interconnectivity provided the Internet-base computer network of the invention, additional file management features are available. For example, files and folders may be shared between users connected to the network. The invention provides techniques to control access to files. Access rights includes, for example, no access, read access, write access, and full access. Also, files may be accessed and manipulated by one or more authorized users, even concurrently, and techniques are provided to maintain the files. Some of the files, and their contents, can also be freely transferred through the web. URL links can also be generated to allow external access, through the Internet, to some of the files.

In an embodiment, for each user, the network maintain three separate folders labeled as secure (or "private"), open (or "publish"), and limited access (or "friends"), as shown in window 610 in FIG. 6. However, greater or fewer number of folders can be provided and is within the scope of the invention. An appropriately identified icon in window 610 represents each of these three folders. A private folder icon 622 represents the private folder, a publish folder icon 624 represents the published folder, and a friends folder icon 626 represents the limited access folder.

The private folder is accessed by clicking on private folder icon 622 to open a private folder window 630. The private folder contains protected files that are accessible only by the authorized users. No URL links are provided to files in this folder. No access is possible to files in the private folder from the Internet, except from the virtual desktop of the authorized user. The private folder can include a multi-level listing (e.g., a file located within a folder that is located within another folder, and so on).

The public folder is similarly accessed by clicking on publish folder icon 624 to open a publish folder window 640. The public folder contains unprotected files that are freely accessible by everyone (i.e., with fill read access). A file in the publish folder can be associated with a URL link, and FTP access to the files is also available. Files in the publish folder are to be shared between all who have access to the network. The publish folder can also include a multi-level listing.

Files in the publish folder may be associated with additional features not available or appropriate for other file types, and additional menu choices can be provided to activate these features. By clicking on a file or folder in window 640, a menu screen 642 appears which lists the possible application choices. The choices can include, for example, an album viewer and a HTML editor that facilitate the creation of a public homepage for the selected file.

The limited access folder is accessed by clicking on friends folder icon 626 to open a friends folder window 650. The limited access folder contains protected files that are accessible only by those specifically authorized by the user. The extent of the access is also limited to the rights granted by the user, which may include read only, read and write, and others. Each limited access file can be individually tailored with different rights granted to different "friends." For example, friend A may be granted read only access to file X, friend B may be granted full access to the same file, and so on.

Window 650 can also contain a list 652 of links to other friends (e.g., other users who are denoted as friend by this user). By clicking on a particular link in list 652, a window 654 opens which lists the files available to this user from the friend associated with the link. The user clicks on a friends link listed in window 650 to see a list of publish files available from that friend, and also a list of the limited access files from that friend that are available for access by this user. Window 650 also contains a search and query box 656 that allows the user to search for other users who consider this users as their friend. A window 658 would then appear that lists the results of the search.

Because of the integration provided by the invention, additional file manipulation features are available. For example, in box 614, a menu choice can be provided to e-mail the selected file or folder. By selecting this menu choice, the e-mail application is conveniently activated and a window 660 for a new e-mail message is generated. The e-mail message automatically includes the selected file or folder in the attachment section. The user then simply enters the recipient's address and sends off the message.

Figure 7:
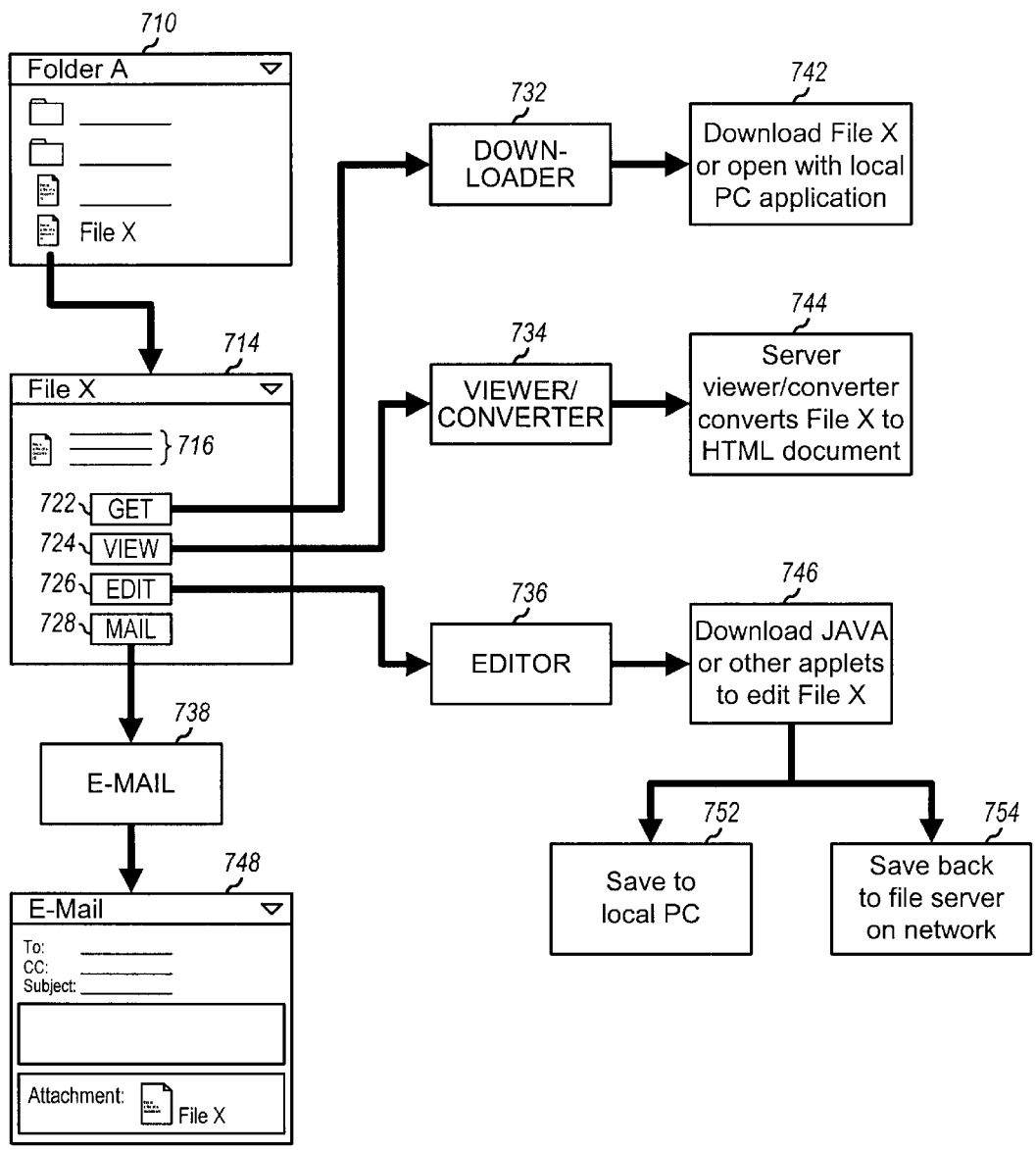
FIG. 7 shows a diagram of additional processes of the file management system of the invention.

FIG. 7 shows a diagram of additional processes of the file management system of the invention. A file window 710, corresponding to window 434 in FIG. 4, appears on the user's virtual desktop by (double) clicking on a file icon on the virtual desktop. File window 710 includes a listing of the files and folders within the selected folder. By clicking on a particular file or folder, a window 714 appears that includes the available menu choices for the selected item. As shown in FIG. 7, a File X is selected.

File window 714 can include, for example, a listing 716 of information on the selected file such as the file version, the file type (e.g., a word processing, spreadsheet, or other document types), the size of the file, who created it and when, who last modified it and when, who has access rights to it, whether a payment must be made to use the file, and so on. File window 714 can also include buttons that indicate the menu choices available for the selected file, such as get, view, edit, mail, and so on.

By clicking on a get button 722, a downloader 732 is activated which initiates a download of the selected file (i.e., to the user's computer system or the local PC), as indicated by at 742. The downloader can also open the selected file with a local PC application as indicated by the file information. The downloaded file can be printed, copied, edited, or otherwise processed.

By clicking on a view button 724, a viewer/converter 734 is activated. Viewer/converter 734 is typically resident on the application server and invoked when selected. Viewer/converter can, for example, convert the selected file into an HTML file, as indicated at 744. Viewer 734 can also convert, for example, a PowerPoint™ presentation into a JPEG file, a WordPerfect™ document into a HTML file, and so on.

Once the file is converted into the destination format (e.g., HTML or JPEG), it can be easily manipulated by standard applications designed to operate on these file formats. The converted files can also be printed, viewed, copied, and so on.

By clicking on an edit button 726, an editor 736 is activated. The editor can be written with JAVA™ or other programming languages (i.e., using applets) that can be downloaded onto the local PC for execution, as indicated at 746. Editor 736 can also download a selected file (if any) onto the local PC for manipulation by the user. An edited file can be saved to the local PC (as indicated at 752) or back to the user's storage space on the network (as indicated at 754), or both. In an embodiment, while a file is being edited, it is temporarily stored along with the application (i.e., on the local PC) to provide faster access speed. Periodically, the file can be copied back to the network where file backup can be performed.

Alternatively, editor 736 can (already) reside within the local PC and activated when the user clicks on edit button 726. The selected file, if any, can be downloaded onto the local PC for editing. After the file is closed, a copy of the edited file can be uploaded back to the network for storage.

For some situations, it may be more advantageous to execute the editor at the application server. This may occur, for example, if the amount of data to be manipulated is small. In this case, a portion of the editor (i.e., the viewer) can be downloaded onto the local PC (if none already exits). As the file is edited, changes are downloaded onto the local PC for display. Commands from the user are received from the local PC and transmitted to the application server for processing.

By clicking on a mail button 728, an e-mail application 738 is activated. E-mail application 738 can display an e-mail message window 748 that conveniently includes the selected file as an attachment. The user then simply fills in the appropriated fields (e.g., TO, CC, and SUBJECT fields) in window 748 and hits the send button. This feature is particularly convenient for the web-based computer network of the invention.

Figure 8:
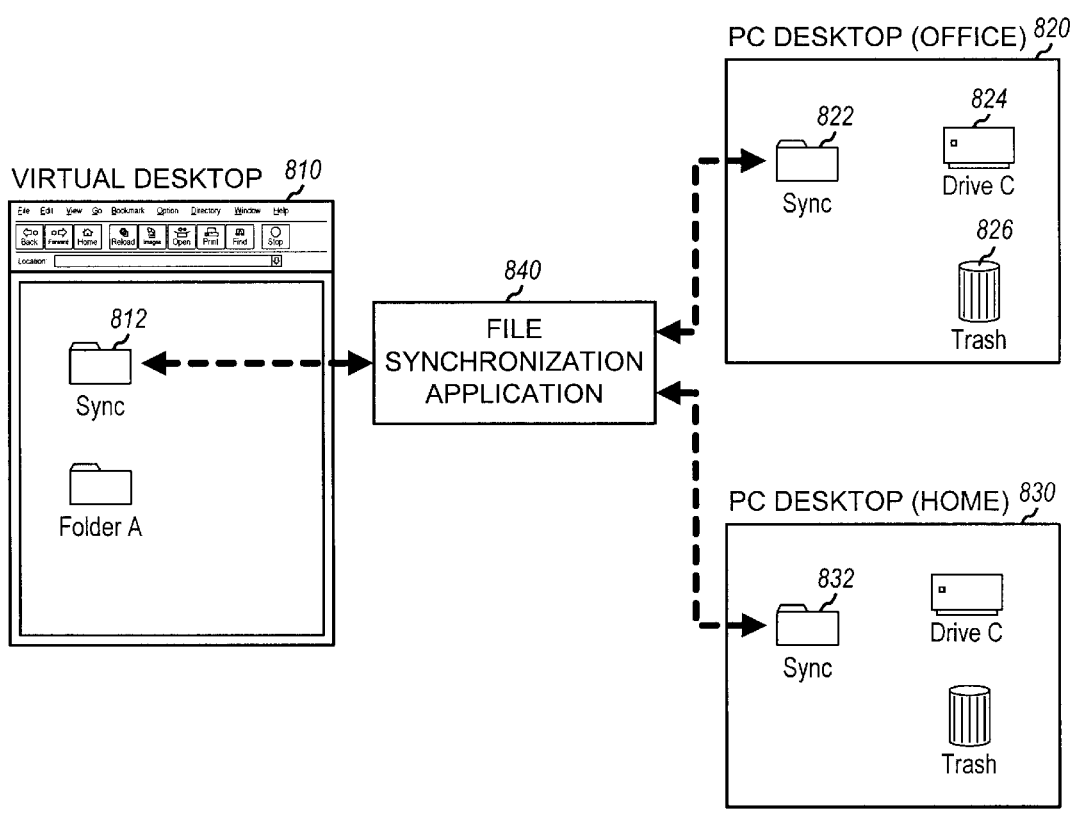
FIG. 8 shows a simplified diagram of an embodiment of the file synchronization feature of the invention.

FIG. 8 shows a simplified diagram of an embodiment of the file synchronization feature of the invention. As noted above, files and folders can be easily transferred and shared between the storage on the network and the local PCs (e.g., the office desktop PC, the home desktop PC, or a portable PC) used to access the virtual desktop. File sharing greatly enhances flexibility but requires the file management system to maintain up-to-date copies of the files.

As shown in FIG. 8, a virtual desktop window 810 includes a sync folder icon 812. An office PC desktop window 820 includes a sync folder icon 822, a hard disk icon 824, and a trash icon 826. Similarly, a home PC desktop window 830 includes a sync folder 832. The communications between the PC desktops and the virtual desktop is coordinated by a file synchronization application 840. Although typically one desktop PC accesses the virtual desktop at any give moment, there may be situations when multiple desktop PCs concurrently access the virtual desktop (i.e., such as when files are being shared between two users at two desktop PCs). Windows 810, 820, and 830 typically include other icons that are not shown in FIG. 8 for clarity. Also, more than one sync folder can be created on a particular desktop.

The sync folders on the desktop PCs contain files and folders to be maintained "in sync" with their duplicates on the network. The user is able to access and manipulate the items in the sync folder like any other folders. These items are functionally indistinguishable to the user except for the sync feature.

In an embodiment, if the user maintains a sync folder on the PC desktop and the sync folder has at least one item, the file synchronization application is launched and runs in the background of the desktop PC. At the designated update times, the file synchronization application exchanges with the file server information pertaining to the items in the sync folder. Files are then transferred and updated based on the exchanged information and in accordance with the instructions set by the user, as further described below.

The update times can be designated by the user or selected automatically by the file synchronization application. For example, the user can elect to update the files at the start of a session, at the end of the session, during the session, or a combination of the above. The user can also elect to have the files updated at specific times (e.g., at midnight everyday) or only when the user commands. If no times are designated by the user, the synchronization application can automatically select the update times. The user can also selectively enable and disable the file synchronization feature.

In performing the file synchronization at the designated time, the synchronization application first retrieves information for items in the sync folder. For each item in the folder, the application then compares the last edit time of the item in the PC desktop with its duplicate, if any, on the file server. If the times match, no additional work is performed. Otherwise, if the times do not match, the files are updated in accordance with a method selected by the user. For example, the newer item can be written over the older item, the newer item can be saved as a new version, and so on. The updated item is indicated accordingly (i.e., with a name change, an extension change, or a version change in the file attribute). If a file is recently created and a corresponding duplicate does not exist, the recently created file is duplicated on the other desktop.

The file synchronization feature ensures that the user has access to the most current files at any given moment, and from virtually anywhere web access is available.

Additional Features

Figure 9:
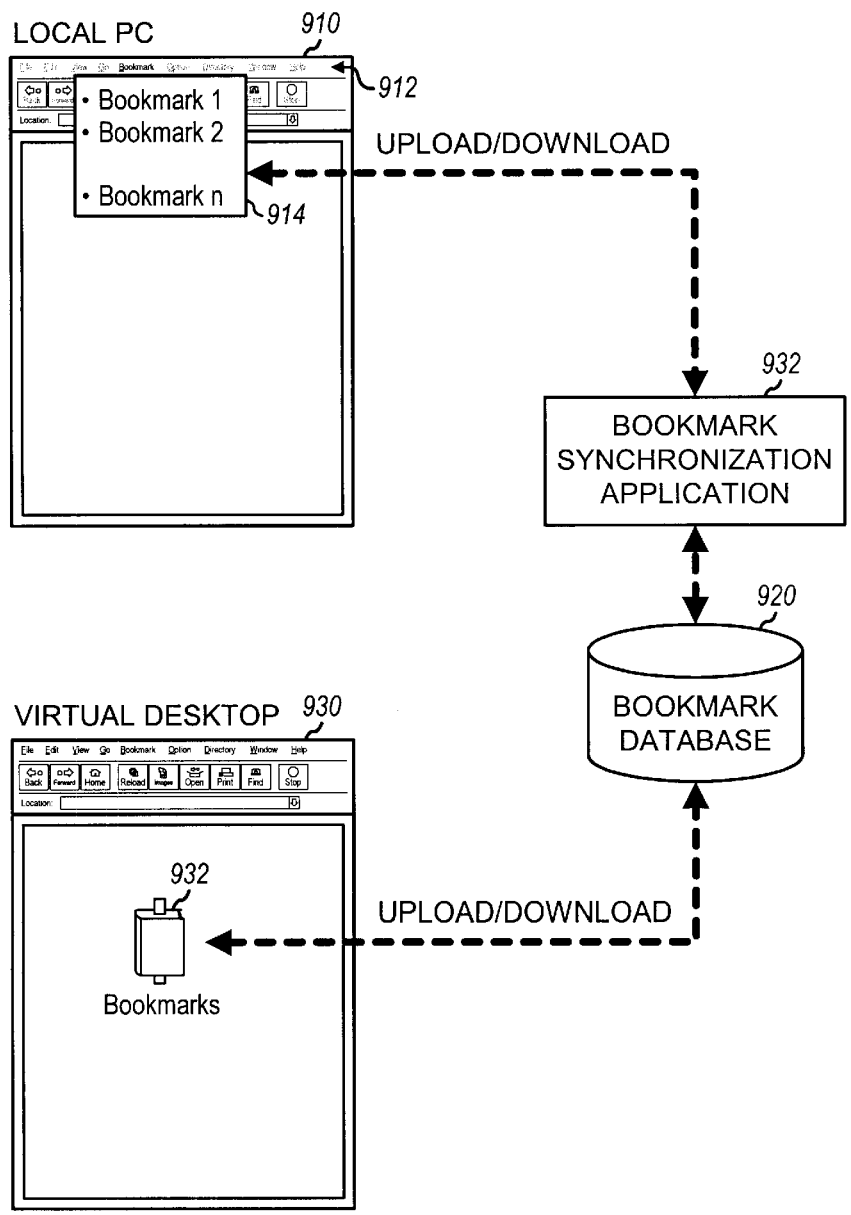
FIG. 9 shows a diagram of an embodiment of the bookmark synchronization feature of the invention.

FIG. 9 shows a diagram of an embodiment of the bookmark synchronization feature of the invention. This feature allows the user to have access to the same bookmarks regardless of where and when the bookmarks are created. As shown in FIG. 9, on the local PC, a browser (e.g., Netscape™ or Internet Explorer™) is executed which opens a browser window 910. Window 910 includes a pull down main menu 912 that lists, among other menu choices, the "Bookmark" or "Favorite" menu choice. By clicking on the Bookmark menu choice, a window 914 pops up that lists the bookmarks previously saved by the user. The user is then able to scroll through the bookmarks, click on a particular bookmark, and the URL corresponding to that bookmark is launched.

Conventionally, bookmarks are local to the PC, or more specifically, local to the browser that is installed on the PC. It is generally a time consuming process to search for a particular website. Also, the bookmarks corresponding to the URLs are typically named (i.e., by the user or the browser) with descriptive names for ease of recognition. Thus, it is advantageous to provide the user with access to the same set of up-to-date bookmarks regardless of the computer from which access to the virtual desktop is gained.

In an embodiment, a bookmark database 920 stores the bookmarks of the user. Bookmark database 920 can reside in file server 280 in FIG. 2. The bookmarks in database 920 are uploaded to, and downloaded from, a virtual desktop 930 at the designated times. This allows the user on the local PC to have access to a familiar set of bookmarks on the virtual desktop. On virtual desktop 930, the bookmarks are contained in a bookmark folder 932.

The bookmarks in database 920 can also be uploaded to, and downloaded from, the local PC. Upon activation by the user, a bookmark synchronization application 932 is executed and runs in the background on the local PC. At the designated times, application 932 "grabs" the bookmarks from database 920 and loads the local PC with the retrieved bookmark information. Thus, the bookmarks on the local PC are synchronized with the bookmarks on the virtual desktop. The browser loaded on the local PC, including Netscape™ and Internet Explorer™ can also have access to the bookmarks. The bookmarks are freely transferable between the local and virtual desktops, and also between the different browser applications.

Figure 10:
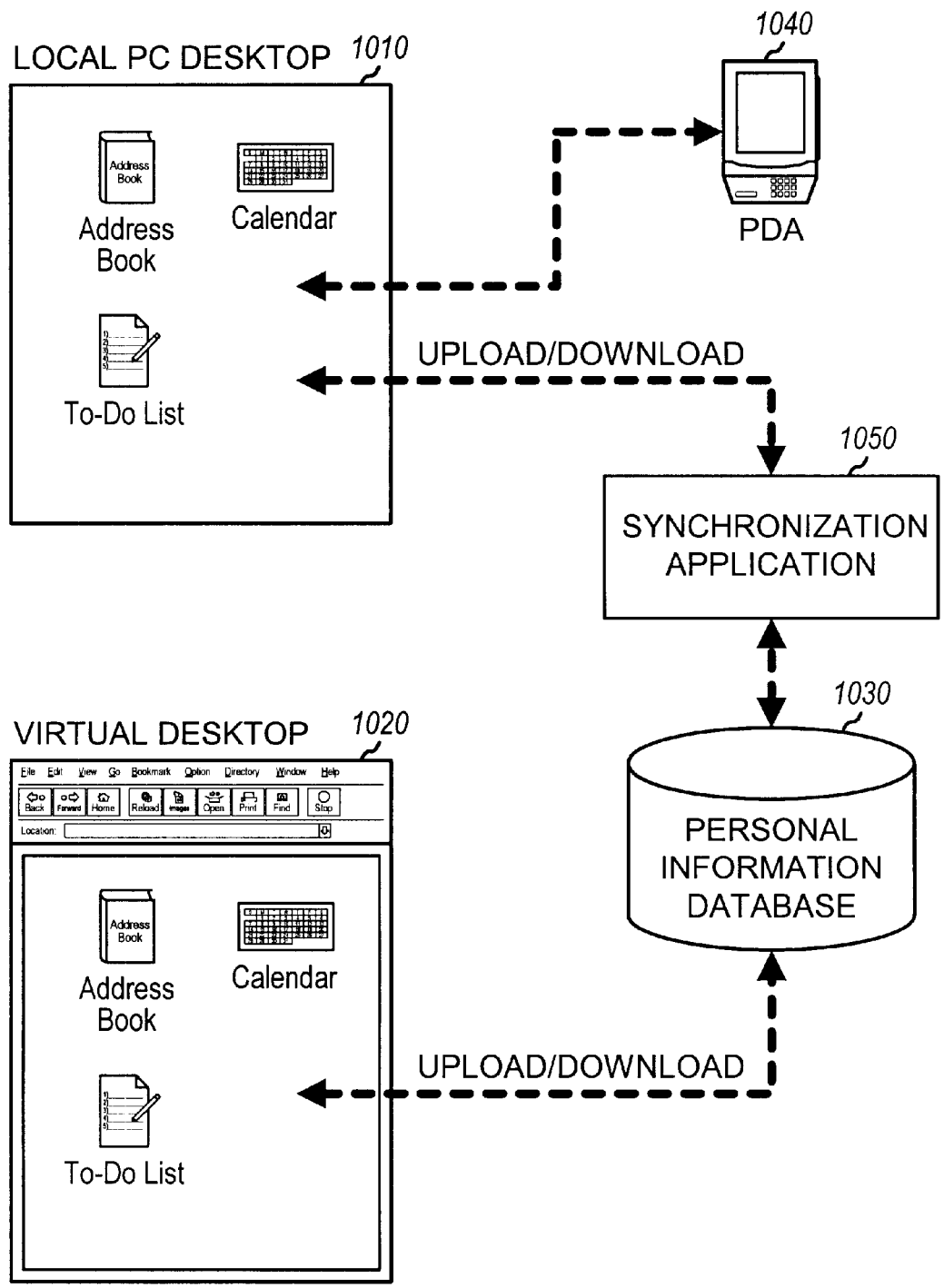
FIG. 10 shows a diagram of an embodiment of some of the features provided by a personal information manager of the invention.

FIG. 10 shows a diagram of an embodiment of some of the features provided by a personal information manager of the invention. The personal information manager maintains a database of information personal to the user, including a calendar, an address and contact book, a to-do list, and other information. Similar to the files and bookmarks, it is advantageous to maintain up-to-date personal information in a central location that is accessible from virtually anywhere.

As shown in FIG. 10, a local PC desktop 1010 and a virtual desktop 1020 each includes a combination of icon, folder, or enumerated list of personal information of various types. For example, icons or folders can be generated that identify the user's address book, calendar, and to-do list. The user can access each type of information by clicking on the designated icon. A window is then opened that displays the selected information.

In an embodiment, a personal information database 1030 stores the personal information of the user. Personal information database 1030 can reside in file server 280 in FIG. 2. The personal information can be transferred between database 1030 and desktops 1010 and 1020. The personal information can further be transferred between local PC desktop 1010 and a personal digital assistance (PDA) 1040 such as a PalmPilot™, a Windows CE™, or other (handheld) units.

When enabled by the user, a synchronization application 1050 runs in the background on the local PC. At the designated times, application 1050 updates the personal information on the local PC with the information from database 1030. In this manner, the personal information on the local PC is synchronized with that from the central database.

News, Information, and Services

The virtual desktop and virtual computing environment of the invention provide an integrated link to the vast amount of information on the Internet. Through the virtual desktop, the user is able to quickly and conveniently access other URL links on the Internet. The results gather from the URL links can be manipulated using the applications and tools available on the virtual desktop.

Referring back to FIG. 4, virtual desktop 420 includes icon 426 that represents links to sources of news, information, and services. By clicking on icon 426, window 436 appears. Window 436 can also include folders and URL links to other web sites. The user is able to sort the URL links by category, alphabetical order, chronological order, or some other arrangements. When the user clicks on the highlighted URL link in window 436 (or in a folder within window 436), the web page corresponding to that site is retrieved and displayed (i.e., on window 446). The user can then enlarge window 446 for a larger display.

The contents within window 446 appear as data that can be manipulated by the user similar to data from other files. Thus, the user can select a section or all of the data in window 446 and saves it as a new file, or paste it onto an existing file. The user can also print, perform searches, and otherwise manipulate the data in window 446.

Customization

The virtual desktop can be customized in accordance with the needs and preferences of the user. As part of the customization, the user can change the layout of the virtual desktop, the contents of the virtual desktop, the icon picture, the destination of the query box, the number of items on the desktop, the color of the windows, boxes, and toolbar, and so on. A database of pre-built objects can be provided to assist the user in customizing the desktop.

Figure 11:
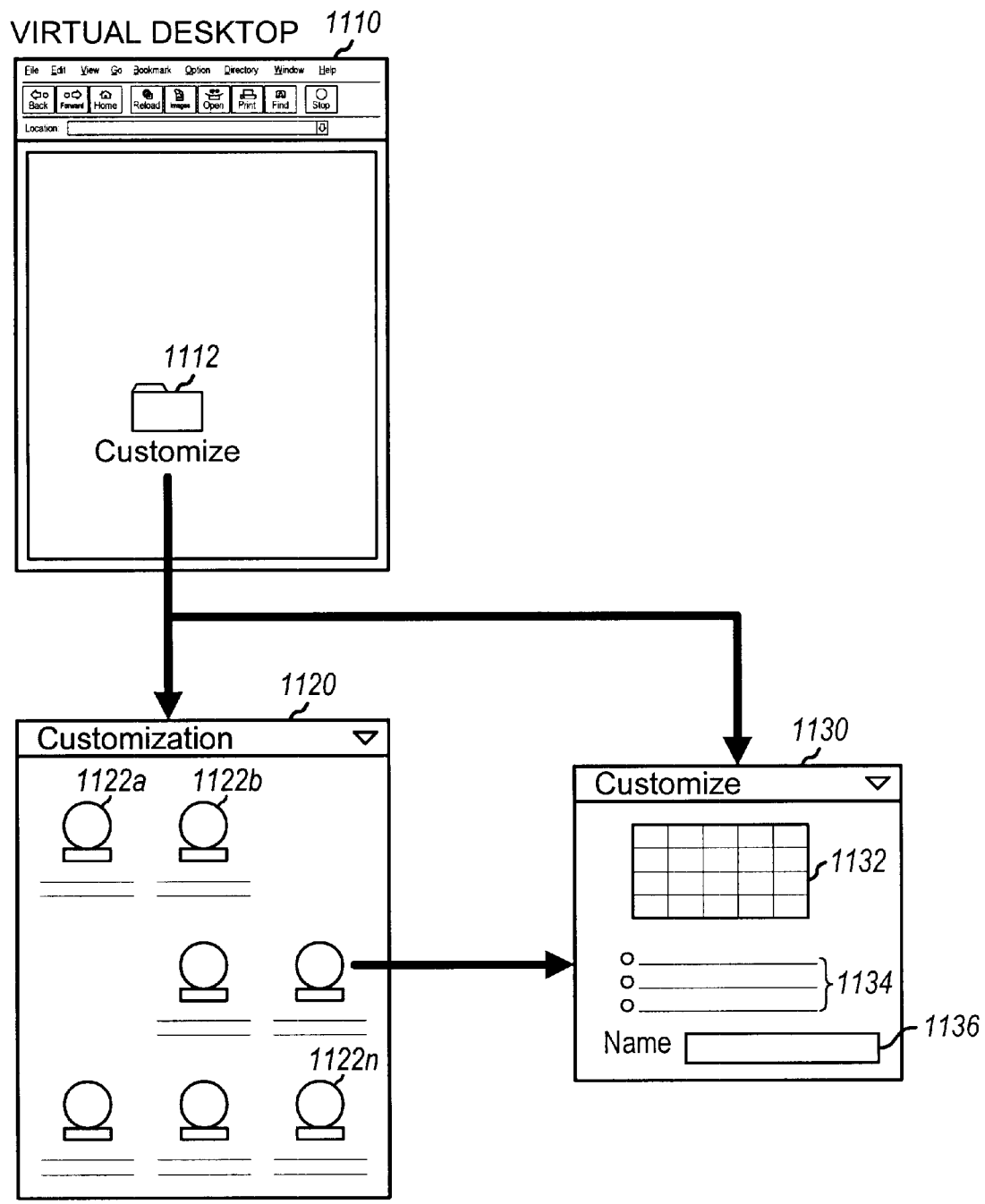
FIG. 11 shows a simplified diagram of an embodiment of the customization process for the virtual desktop of the invention.

FIG. 11 shows a simplified diagram of an embodiment of the customization process for the virtual desktop of the invention. Within a virtual desktop 1110, a customize icon 1112 is provided that includes the tools available to assist the user in customizing the desktop.

In an embodiment, virtual desktop 1110 is partitioned into a grid of blocks. Each block in the grid corresponds to a desktop object. Each desktop object represents an application, a file, a folder, a personal document (e.g., address book, calendar, to-do list), or so on. By (double) clicking on customize icon 1112, a customization window 1120 appears. Customization window 1120 includes a number of desktop objects 1122, one for each block of the grid that has been assigned with an object. The user can create, arrange, or delete objects within the desktop as necessary. For example, similar to many PC desktops, the virtual desktop can include objects associated with word processing, spreadsheet, e-mail, and other applications. By clicking on a particular desktop object 1122, a customize window 1130 appears which includes the tools to modify the selected object.

In another embodiment, the user is able to customize by adding and otherwise modifying items of the virtual desktop (i.e., without reference to the grid). In this embodiment, to edit or modify a particular icon, the user clicks on customize icon 1112 and window 1130 appears.

Window 1130 includes, for example, an icon listing 1132, an item description listing 1134, and a query box 1136. Icon listing 1132 includes the icons of the applications available to the user, icons for files and folders, and icons for other features of the desktops (e.g., calendar, address book, and others). The user selects an icon to be associated with the selected object. Subsequently, the user is able to activate the object (i.e., launch an application) by clicking on the icon. Item description listing 1134 includes items associated with that object (e.g., to-do events, bookmarks, and so on). Query box 1136 allows the user to search for particular items. For example, for the e-mail application, query box 1136 can be used to search for e-mails from a particular recipient, e-mails sent on a particular date, and so on. Query box 1136 can also be coupled to an Internet based search engine to allow the user to search for news, information, and services on the web.

Security

Because the network stores the user's files and personal information, security is an important feature of the invention. In particular, security is provided during a session with the network and in the maintenance of the files. The user is allowed, to an extent, to choose the level of security to be maintained.

Figure 12:
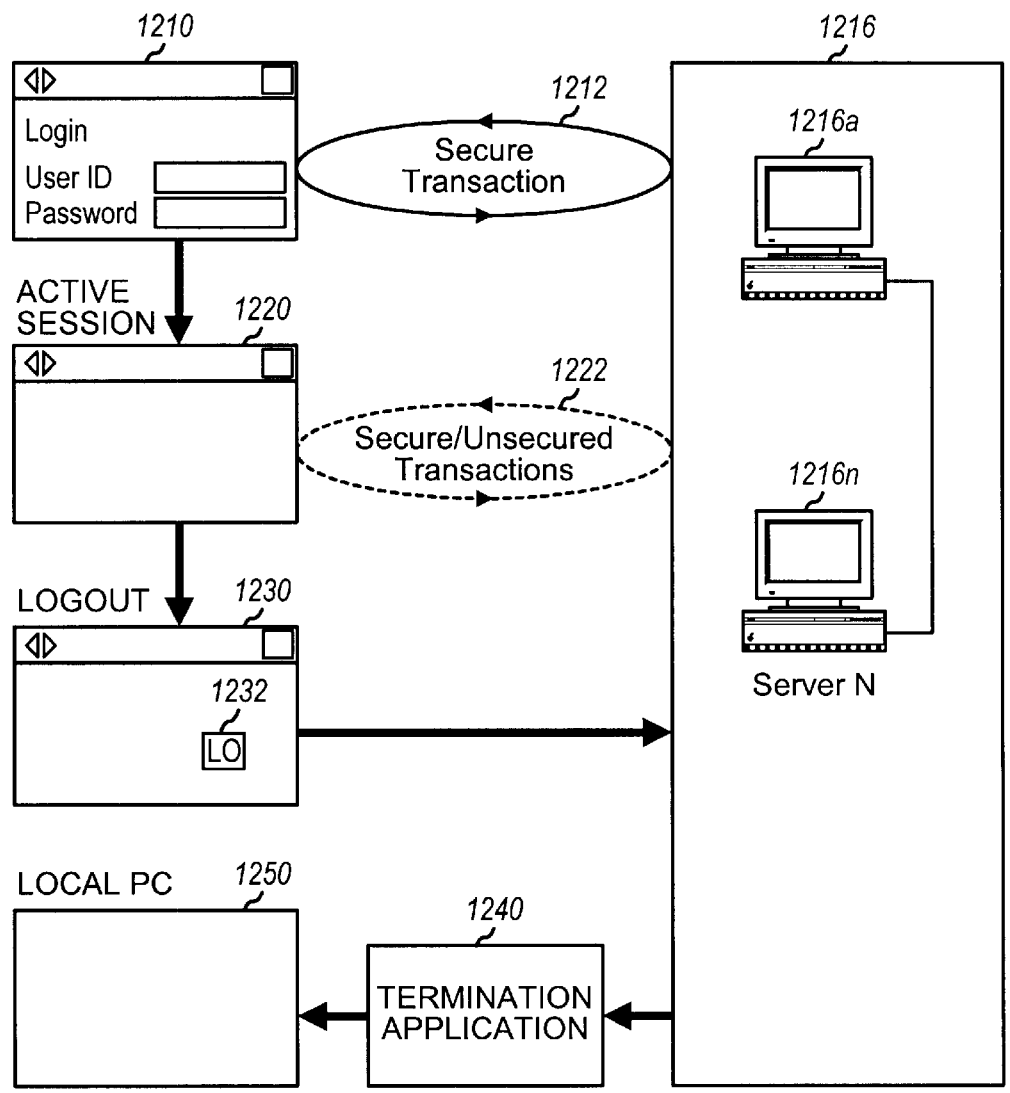
FIG. 12 shows a diagram of an embodiment of the security provided for the virtual desktop of the invention.

FIG. 12 shows a diagram of an embodiment of the security provided for the virtual desktop of the invention. The first level of security is provided by the use of a secured login process. During the login process, a login window 1210 appears on the web page of the URL site server. Login window 1210 includes fields for the user identification and the user password. The login information is entered by the user and transmitted to the site server where it is compared with the information in a login database. The user is only granted access if the login information match. The login is typically performed as a secure transaction 1212 using, for example, a secured socket layer (SSL) that is defined by IEEE and ISO standards and supported by the browser application. Servers 1216 include collectively the site server, the backend servers, and other servers that may be contacted during a session.

Once logged in, the user is granted access to the user's virtual desktop. As shown in FIG. 2, firewall 232 exists between the Internet 210 and site server 230. Firewall 232 supports transactions that use HTTP/FTP protocol. As a choice, the user is allowed to select encryption for the login process only, or encryption for the entire session. Thus, during an active session, the transactions can be secured or unsecured, which is indicated by dashed lines for transactions 1222. If full encryption is selected, each transaction between the local PC and the site server is a secured process. Full encryption may slow down the communications between the local PC and the site server because of the extra encryption processing, but provides a secured computing environment. Additionally, a virus check can be performed on files before the upload (and download) from the local PC to the network.

To terminate the session, the user logs out by clicking on a logout (LO) icon 1232 on a virtual desktop 1230. The logout command is sent to servers 1216. In an embodiment, as part of the logout process, servers 1216 execute (or direct execution) of a termination application 1240 which clears the RAM on the local PC 1250 and the hard dish cache so that "ghost" copies of files are destroyed upon termination of the session. Termination application 1240 can reside on the local PC (i.e., as part of the local PC operating system) that is activated by servers 1216.

Virtual Desktop Processes

Figure 13A:
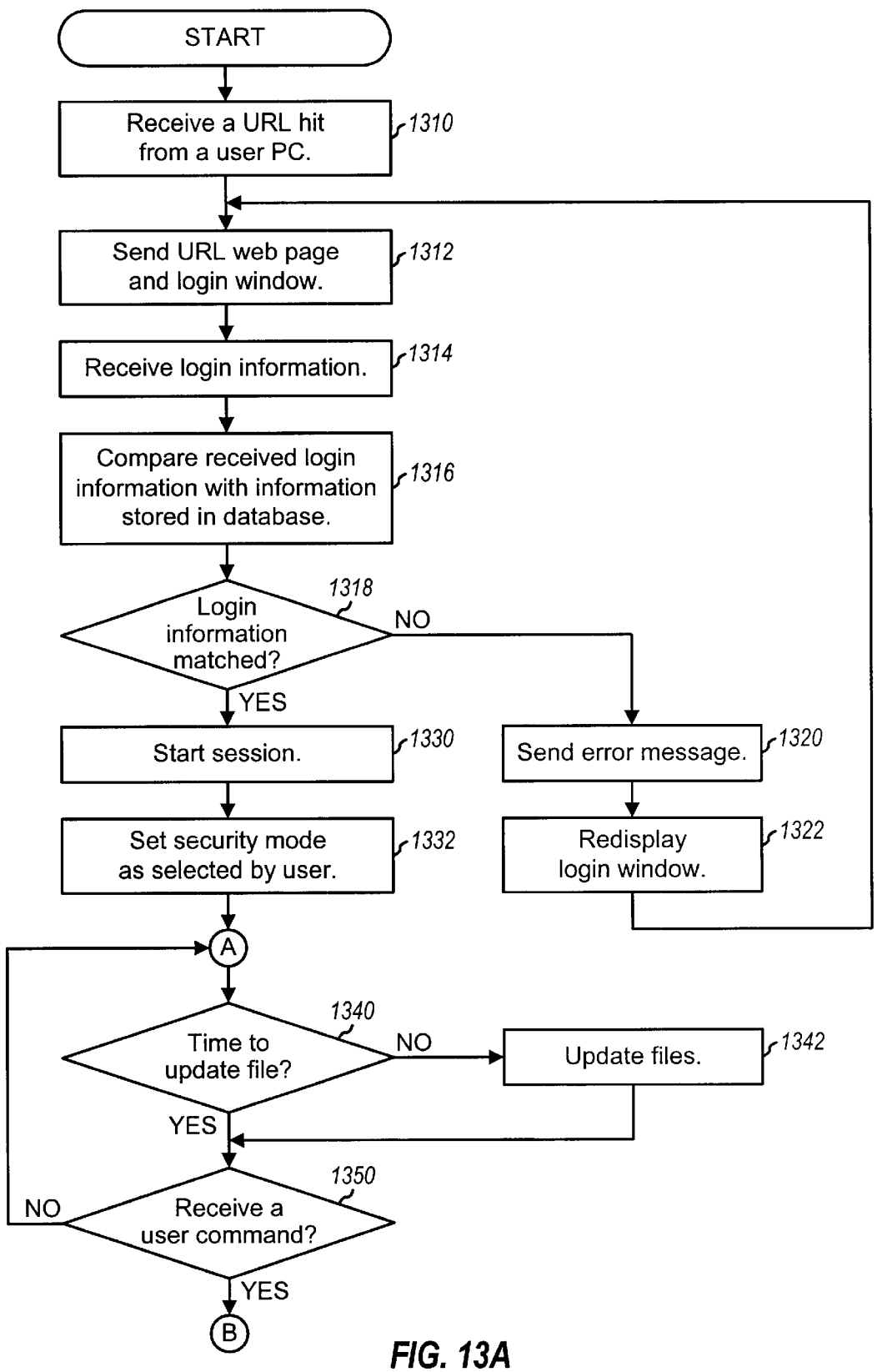
FIGS. 13A and 13B show a flow diagram that describes an implementation of an embodiment of the virtual desktop of the invention.
Figure 13B:
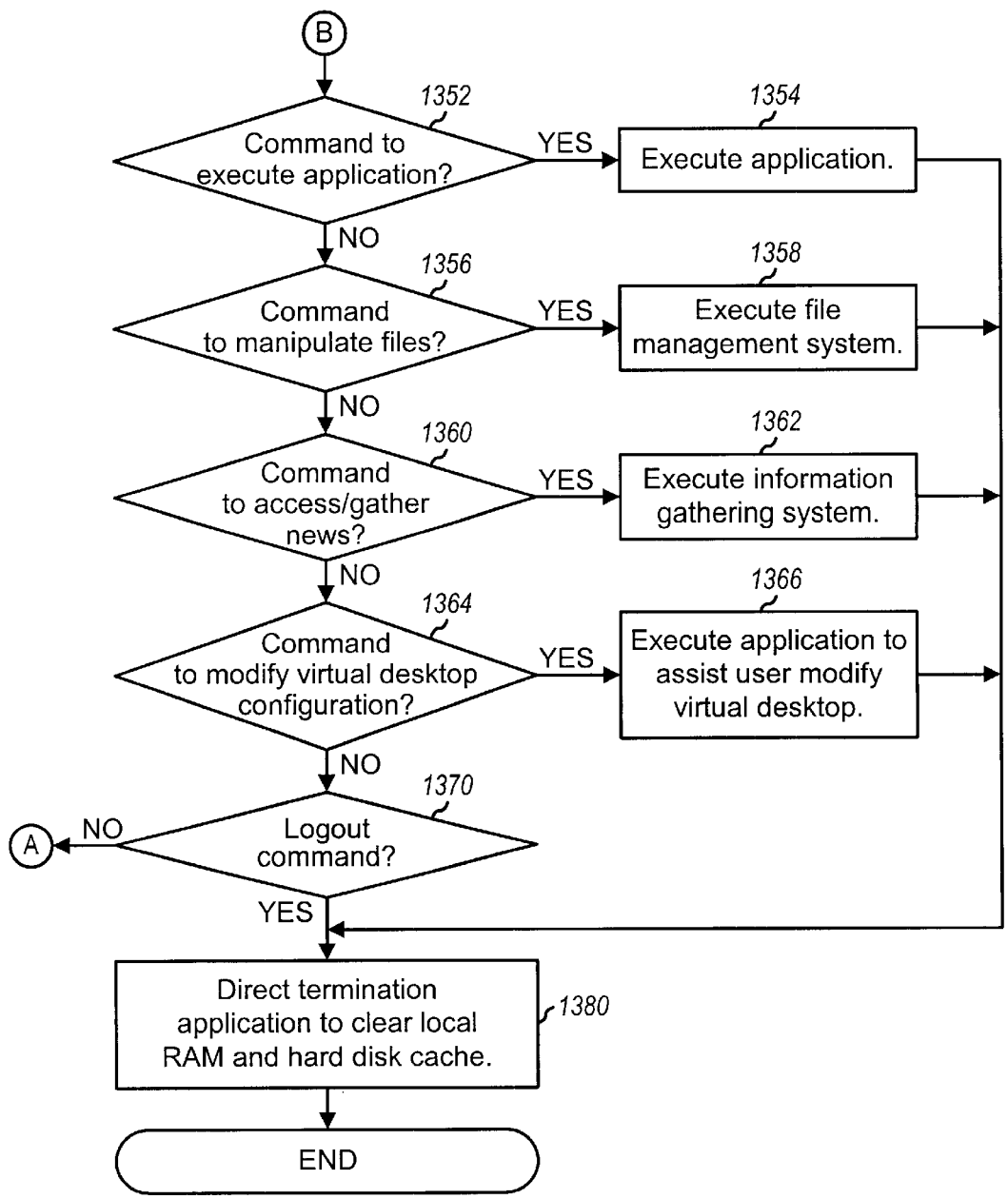

FIGS. 13A and 13B show a flow diagram that describes an implementation of an embodiment of the virtual desktop of the invention. The flow diagram describes implementation of some of the features recited above. Thus, FIGS. 13A and 13B should only be taken as representative, and not limitation, of the invention.

In FIG. 13A, at a step 1310, the URL website that supports the virtual desktop receives a URL access from one of the local PC. In response, the URL sends its web page and a login window, at a step 1312. Shortly thereafter, the URL receives, at a step 1314, the login information and compares, at a step 1316, the received login information with the login information stored at the URL for that user. At a step 1318, a determination is made whether the received login information is valid. If the received login information is not valid, an error message is sent to the local PC, at a step 1320, the login window is redisplayed, at a step 1322 (i.e., with the previously entered data removed from the login window fields), and the site server returns to step 1312.

If the login is valid, the session starts at a step 1330. The site server then directs one of the backend server to handle the session with the user. The security mode (e.g., no encryption, partial encryption, or fall encryption), as selected by the user or the server, is then set by the server, at a step 1332.

In FIG. 13B, at a step 1340, a determination is made whether it is time to update the files (i.e., on the local PC or the virtual desktop). The file update can be part of the file synchronization process. The user, in various ways as described above, can designated the update time. If it is time to update the files, the file synchronization application (in conjunction with the file server) updates the files, at a step 1342. Although not included in the flow diagram, it is presumed that the file sync application is already executed and running (i.e., at step 1330). If the update time has not arrived, or after a file update, the backend server continues to a step 1350 where it is determined whether a user command has been received. If the answer is no, the backend server loops back to step 1340.

Otherwise, if a user command has been received, the backend server proceeds through a series of decisions to determine the type of command received. At a step 1352, a determination is made whether the command is to execute an application. If the answer is yes, the selected application is executed by the application server, at a step 1354. Otherwise, at a step 1356, a determination is made whether the command is to manipulate a file. If the answer is yes, the file management system is executed by the file server, at a step 1358. Otherwise, at a step 1360, a determination is made whether the command is to access and/or gather information and news. If the answer is yes, the news gathering application is executed, at a step 1362. Otherwise, at a step 1364, a determination is made whether the command is to modify the virtual desktop configuration. If the answer is yes, the virtual desktop configuration application is executed, at a step 1366. Otherwise, at a step 1370, a determination is made whether the command is to log out. If the answer is no, the backend server loops back to step 1340. Otherwise, if the user chooses to log out, the virtual desktop application directs the termination application to clear to local RAM and hard disk cache, at a step 1380.

Figure 14:
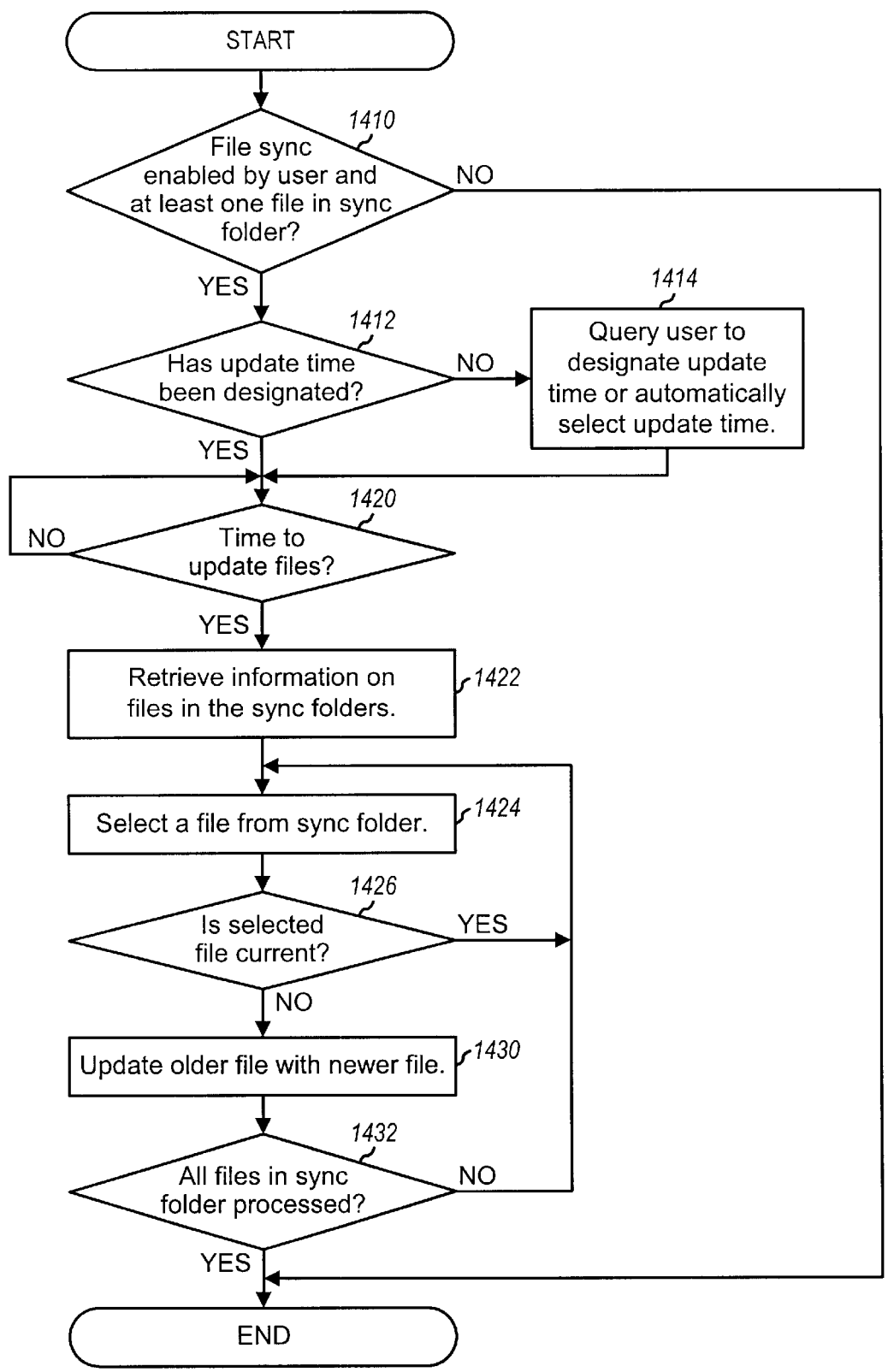
FIG. 14 shows a flow diagram that describes an implementation of an embodiment of the file synchronization of the invention.

FIG. 14 shows a flow diagram that describes an implementation of an embodiment of the file synchronization of the invention. The flow diagram describes implementation of some of the file synchronization features recited above, and should only be taken as representative, and not limitation, of the invention.

In FIG. 14, at a step 1410, a determination is made whether the file synchronization feature is enabled by the user, whether a sync folder exists, and whether the sync folder contains at least one file. If the answer is no to any of these inquires, the file synchronization is not performed. Otherwise, at a step 1412, a determination is made whether the update time has been designated. If the answer is no, the user is queried to designate the update time, at a step 1414. Alternatively, the file synchronization application can automatically select the update time. The file synchronization application then proceeds to a step 1420 where a determination is made whether the update time has arrived. If the answer is no, step 1420 is repeated. Otherwise, if it's time to update the files, the application retrieves information on the files in the sync folder on the local PC and the virtual desktop, at a step 1422. At a step 1424, a file from the sync folder is selected. A determination is then made, at a step 1426, whether the selected file is current. This is performed by comparing the file information and noting the differences, as described above. If the selected file needs updating, at a step 1430, the older file is updated with the newer file by either saving the newer file over the older file or saving the newer file as a new version or under a new name. At a step 1432, a determination is made whether all files in the sync folders have been processed. If the answer is no, the application returns to step 1424 where the next file in the sync folder is selected. Otherwise, the file synchronization process terminates.

Virtual Desktop Implementation

The invention can be implemented in various manners using various software tools. A specific implementation is described below. However, alternative implementations of the invention can be made and are within the scope of the invention.

In a specific embodiment, the invention is implemented using a set of program modules that are linked together to perform the required functionality. In a specific embodiment, the modules are written using a software tool entitled Active Server Page from Microsoft Corporation. The modules reside within the backend server and are invoked (i.e., in response to a user command) to provide the requested service. A web server application entitled Internet Information Server (IIS) from Microsoft Corporation executes the modules and provides features (e.g., SSL support) used by some of the modules.

Table 1 in the attached Exhibit lists a set of program modules and their functionality. The first column in Table 1 lists the name of the program module, the second column lists the link information, and the third column includes a description of the functionality of the modules. Most of the modules have a asp extension to denote that they are written using Active Server Page from Microsoft Corporation. In the second column, for each particular module, the upper box lists other modules that link to this module, and the lower box lists other modules that are linked from this module. For example, the login.asp module links to the desktop.asp module. Correspondingly, the desktop.asp module (the third entry in Table 1) is linked from the login.asp module. As shown in Table 1, a module can link to multiple other modules, and multiple modules can link to a particular module.

The third column of Table 1 describes some of the functionality for each module. However, additional features and functionality can be programmed into the modules listed in Table 1, depending on the particular system requirements. Also, additional modules can be programmed and linked to those listed in Table 1. For example, although not explicitly shown in Table 1, modules that facilitate the execution of applications available on the virtual desktop (e.g., Words™, Excel™, Lotus™, and so on) can be written and deployed.

Table 2 lists the interactions between the program modules and the various servers within the network. The modules in Table 1 are listed again in the first column of Table 2. The second through sixth columns in Table 2 correspond to data server 276, e-mail server 272, viewer converter 270, file server 280, and controller server 240, respectively. These various servers are shown in FIG. 2.

As noted earlier, the program modules reside in the backend server. Each of the other "specialty" servers (e.g., data server, e-mail server, viewer converter, file server, and controller server) performs a predefined set of tasks. Each of the specialty servers generally includes an "agent" that manages that server and communicates with the program modules residing in the backend server. The agents can be software products manufactured by various vendors, or customized software products written in any programming languages generally available. For example, the data server is managed by an SQL agent available from Microsoft Corporation, the viewer converter is managed by the Outside In Server© product from INSO Corporation, and the secure socket layer (SSL) function of the controller server is performed by a SSL agent from the Internet Information Server (IIS) product from Microsoft Corporation. The Outside In Server application is able to convert files of various formats (e.g., Words™, Excel™, PowerPoint™, Lotus™, Access™, and others) into HTML format for viewing on-line. Generally, no agents are required to manage the file server, as the program modules that access the file server also manage the file server.

The specialty servers are accessed as necessary by the program modules residing in the backend server. Table 2 lists the modules and the servers accessed by the modules, as indicated by the "Y" in the table entry. For example, the login.asp module can access the data server, the file server, and the controller server during execution of the login.asp module.

Table 3 lists the interactions between the program modules and the various databases within the system. The modules in Table 1 are listed again in the first column of Table 3. The second and third columns in Table 3 correspond to the user information database and the desktop database, respectively. The fourth through sixth columns correspond to the e-mail database, the seventh and eight columns correspond to the calendar database, the ninth and tenth columns correspond to the bookmark database, the eleventh column corresponds to the address book database, and the twelfth column corresponds to the friend database. Referring back to FIG. 2, the user information database is implemented in databases 242 and 274, the e-mail database is implemented in database 274, and the remaining databases in Table 3 are implemented in database 278.

The user information database includes information associated with a particular user, including the login information. The desktop database includes information that define the user's desktop. The e-mail database includes information on the e-mails of the user. In an embodiment, the e-mail database is partitioned into three smaller databases for the e-mail message, the recipient, and the file attachment. The calendar database includes information on the user's calendar, and is partitioned into two smaller databases for the calendar event and the calendar sharing. Calendar sharing database includes the list of users authorized to access and/or update another user's calendar. The bookmark database includes information on the user's bookmark, and is partitioned into two smaller databases for the bookmarks themselves and the bookmark category. The bookmark categories are selectable by the user and are akin to folders for holding bookmarks associated with that user. The address book database includes information on the user's address book. And the friend database includes information on the user's friends.

As shown in Table 3, each module has access to a predetermined number of databases. For example, the login.asp module has read access to the user information database, and the userreg.asp module has read and write access to the same user information database.

In an embodiment, a load balance module tracks the amount of activity on each of the backend servers in the network. The module then determines a distribution of the workload that balances the network and provides good response time to a large number of user. The load balance module then distributes the workload between the backend servers. In an embodiment, the load balance module includes counters that keep track of the amount of processing performed by each of the backend servers.

Computer System

Figure 15:
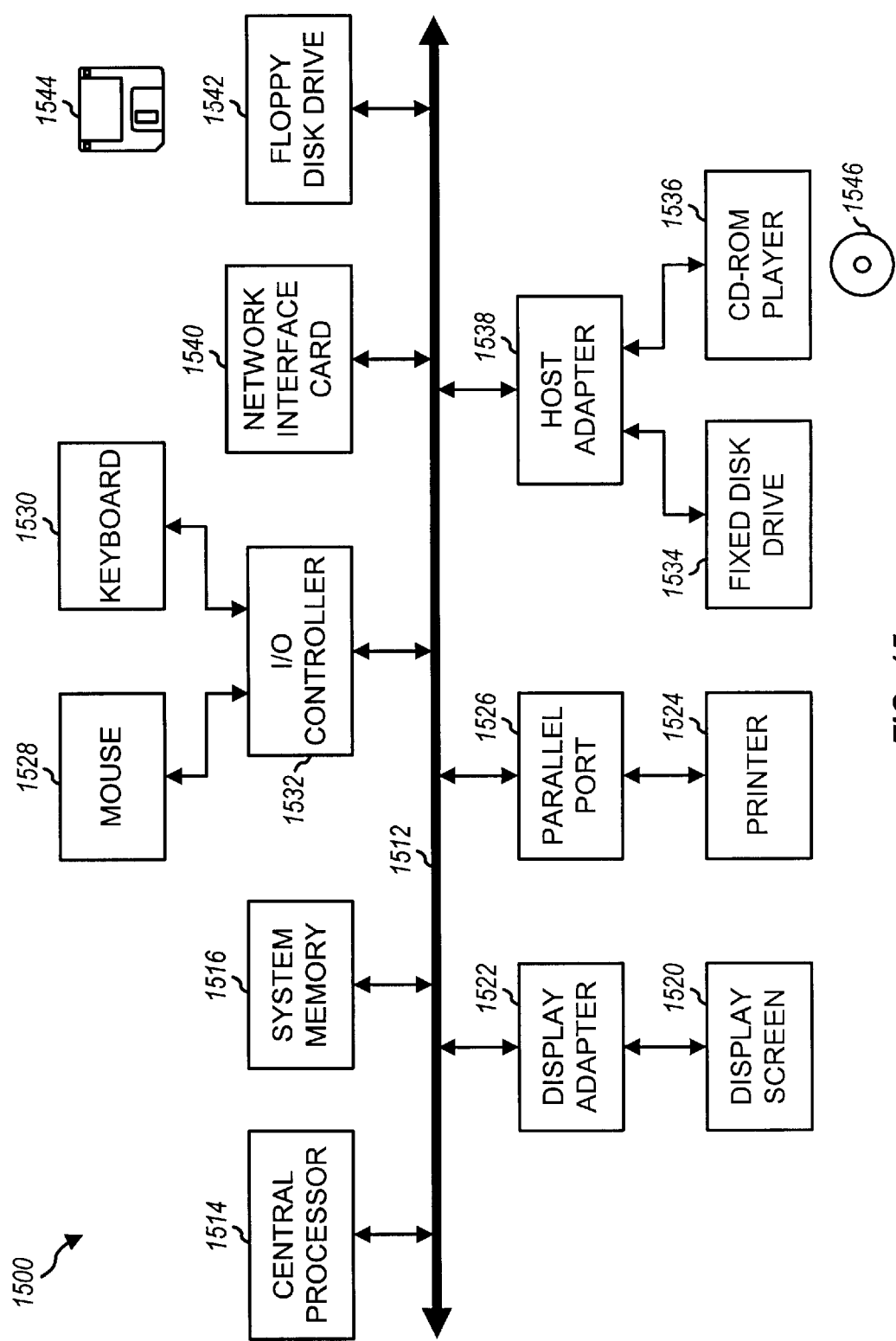
FIG. 15 shows the basic subsystems of a server 1500 suitable for use with the invention.

FIG. 15 shows the basic subsystems of a server 1500 suitable for use with the invention. Server 1500 can implement, for example, user terminal 210, site server 230, controller server 240, backend server 260, viewer converter 270, e-mail server 272, database server 276, file server 280, and application server 290 in FIG. 2. In FIG. 15, computer system 1500 includes a bus 1512 that interconnects major subsystems such as a central processor 1514, a system memory 1516, and external devices such as a display screen 1520 via a display adapter 1522, a printer 1524 via a parallel port 1526, a mouse 1528 and a keyboard 1530 via an input/output (I/O) controller 1532, a fixed disk drive 1534 and a CD-ROM player 1536 via a hose adapter 1538, a network interface card 1540, and a floppy disk drive 1542 operative to receive a floppy disk 1544.

Many other devices or subsystems (not shown) can be connected, such as a scanning device, a touch screen, and others. Also, it is not necessary for all of the devices shown in FIG. 15 to be present to practice the present invention. Furthermore, the devices and subsystems may be interconnected in different ways from that shown in FIG. 15. The operation of a computer system such as that shown in FIG. 15 is readily known in the art and is not discussed in detail in the present application. Source code to implement some embodiments of the present invention may be operatively disposed in system memory 1516 or stored on storage media such as fixed disk drive 1534, floppy disk 1544, or a CD-ROM 1546 that is operative with CD-ROM player 1536.

For clarity, the invention has been described in the context of the Internet and for a specific implementation using support products available from Microsoft Corporation. The specific details are intended to be illustrative, and not limitations, of the invention. It will be recognized that alternative implementations of the invention and modifications of the techniques described herein can be made (i.e., to satisfy a particular design requirement). For example, the invention can be implemented within any computing network, including local area network, a campus network, a wide area network, or others. Further, the program modules that implement the invention can be written in other codes (e.g., C, C++, Java, or others). Accordingly, these variations are all within the scope of the invention The previous description of the specific embodiments is provided to enable any person skilled in the art to make or use the invention. The various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein, and as defined by the following claims.

What is claimed is:

1. A computer implemented method for providing a virtual desktop at a remote computing device, comprising:
   receiving at a server a first URL from the computing device;
   in response to receiving the first URL, retrieving a first web page representative of the virtual desktop for a particular user account, wherein the first web page includes links for applications and files accessible from the computing device for the particular user account;
   returning the first web page to the computing device;
   receiving from the computing device a first command sent via the first web page for an application or a file available on the virtual desktop;
   sending the application or file from the server to the computing device for execution or manipulation on the computing device;
   maintaining a synchronization folder of files to be maintained in synchronization between the computing device and the server; and
   updating a particular file in the synchronization folder with a corresponding file on the computing device at a designated time.

2. The method of claim 1, further comprising:
   receiving from the computing device a request to access the particular user account; and
   determining authorization for access to the particular user account, and
   wherein commands received from the computing device are processed only if access to the particular user account is authorized.

3. The method of claim 1, further comprising:
   receiving a second command from the computing device to execute a particular application; and
   coordinating execution of the particular application.

4. The method of claim 1, wherein the first command is for an application, and wherein app lets of the application are sent for execution by a browser application on the computing device.

5. The method of claim 1, wherein the first command is for an application, and wherein codes of the application are sent for execution on the computing device.

6. The method of claim 3, wherein the particular application for the second command is executed at the server.

7. The method of claim 1, further comprising:
   receiving a second command from the computing device to manipulate a particular file; and
   manipulating the file in accordance with the second command.

8. The method of claim 1, further comprising:
   receiving a second command from the computing device to access a hypertext page referenced by a second URL included in the first web page;
   retrieving a second web page corresponding to the second URL; and
   returning the second web page to the computing device.

9. The method of claim 1, further comprising:
   receiving a second command from the computing device to customize the virtual desktop; and
   returning to the computing device a second web page that includes tools and accessories to facilitate customization of the virtual desktop.

10. The method of claim 1, further comprising:
    receiving a second command from the computing device to log out from the particular user account; and
    directing an application on the computing device to clear memory and storage cache on the computing device.

11. The method of claim 1, wherein a session starts when the first web page is returned to the computing device, the method further comprising:
    setting a security mode for the session based on a previously selected security mode for the particular user account.

12. A computer program product for providing a virtual desktop at a client device, comprising:
    code that receives a URL access from the client device;
    code that retrieves a first web page representative of the virtual desktop, wherein the first web page includes icons and links for applications and files accessible via the client device for a particular user account;
    code that returns the first web page to the client device;
    code that receives from the client device a first command sent via the first web page for an application or a file available on the virtual desktop;

code that directs the application or file to be sent to the client device for execution or manipulation on the client device;

code that maintains a synchronization folder of files to be maintained in synchronization with the client device;

code that updates a particular file in the synchronization folder with a corresponding file on the client device at a designated time; and a medium for storing the codes.

13. A computer network configured to provide a virtual computing environment comprising one or more servers, wherein at least one server comprises:

a processor;

an electronic storage medium; and a memory, and wherein the at least one server is configured to receive a URL from a client device, retrieve a first web page representative of a virtual desktop for a particular user account, wherein the first web page includes icons for applications and files accessible from the client device for the particular user account, return the first web page to the client device, receive from the client device a command sent via the first web page for an application or a file available on the virtual desktop, send of the application or file to the client device for execution or manipulation on the client device, maintain a synchronization folder of files to be maintained in synchronization with the client device, and update a particular file in the synchronization folder with a corresponding file on the client device at a designated time.

14. The network of claim 13, wherein the one or more servers include a file server that stores a record for each of a plurality of user accounts.

15. The network of claim 14, wherein the record includes files and folders and a list of applications available to the particular user account.

16. The network of claim 13, wherein the one or more servers include an application server operative to facilitate execution of applications stored in the application server.

17. The network of claim 13, wherein the one or more servers include a viewer converter operative to convert data files into a plurality of selectable file formats.

* * * * *